(12) United States Patent
Woodruff et al.

(10) Patent No.: US 8,645,412 B2
(45) Date of Patent: Feb. 4, 2014

(54) COMPUTING CORRELATED AGGREGATES OVER A DATA STREAM

(75) Inventors: David P. Woodruff, Mountain View, CA (US); Srikanta N. Tirthapura, Ames, IA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/278,469

(22) Filed: Oct. 21, 2011

(65) Prior Publication Data

US 2013/0103711 A1 Apr. 25, 2013

(51) Int. Cl.
*G06F 17/30* (2006.01)
(52) U.S. Cl.
USPC .............................................. 707/769
(58) Field of Classification Search
USPC .............................................. 707/769
See application file for complete search history.

(56) References Cited

U.S. PATENT DOCUMENTS

| | | | |
|---|---|---|---|
| 7,437,397 B1 | 10/2008 | Koudas et al. | |
| 2008/0016031 A1* | 1/2008 | Miao et al. | 707/2 |
| 2010/0030741 A1* | 2/2010 | Johnson et al. | 707/3 |
| 2010/0067535 A1* | 3/2010 | Ma et al. | 370/401 |
| 2011/0153554 A1 | 6/2011 | Cohen et al. | |

OTHER PUBLICATIONS

Cohen et al., "Bottom-k Sketches: Better and More Efficient Estimation of Aggregates", Jun. 12-16, 2007, ACM, SIGMETRICS'07, San Diego, California, USA, 2 pages.*

Indyk et al., "Optimal Approximations of the Frequency Moments of Data Streams", May 22-24, 2005, ACM, STOC'05, Baltimore, Maryland, USA, 8 pages.*

Lahiri, B., et al., "Finding Correlated Heavy-Hitters over Data Streams", Dec. 14-16, 2009, pp. 307-314, IEEE 28th International Performance Computing and Communications Conference, Scottsdale, Arizona, USA.

Gehrke, J., et al., "On Computing Correlated Aggregates Over Continual Data Streams", May 21-24, 2001, 12 pages, ACM SIGMOND 2001, Santa Barbara, California, USA.

Anathakrishna, R., et al., "Efficient Approximation of Correlated Sums on Data Streams", IEEE Transactions on Knowledge and Data Engineering, May-Jun. 2003, pp. 576-572, vol. 15, No. 3, IEEE Computer Society Press, Los Alamitos, California, USA.

* cited by examiner

*Primary Examiner* — Rehana Perveen
*Assistant Examiner* — Alexander Khong
(74) *Attorney, Agent, or Firm* — Ference & Associates, LLP

(57) ABSTRACT

Described herein are approaches for computing correlated aggregates. An aspect provides for receiving a stream of data elements at a device, each data element having at least one numerical attribute; maintaining in memory plurality of tree structures comprising a plurality of separate nodes for summarizing numerical attributes of the data elements with respect to a predicate value of a correlated aggregation query, said maintaining comprising: creating the plurality of tree structures in which each node implements one of: a probabilistic counter and a sketch, wherein said probabilistic counter and said sketch each act to estimate aggregated data element numerical attributes to form a summary of said numerical attributes; and responsive to a correlated aggregation query specifying said predicate value, using said plurality of tree structures as a summary of said data element numerical attributes to compute a response to said correlated aggregate query.

12 Claims, 15 Drawing Sheets

Process 1: Basic Counting: Initialization

1 for $i$ *from 0 to $l_{max}$* do
2    $S_i$ initialized to one bucket, the root. The counter for this bucket is initialized to 0;
3    $Y_i \leftarrow -1$;
4 end

FIG. 2

Process 2: Basic Counting: When an element $y$ arrives

1 for $i$ from $0$ to $\ell_{max}$ do
2     Look for the bucket, say $b$ in $S_i$ such that $y \in span(b)$ and $b$ is a leaf in the tree.
3     if $b$ is open then
4        Increment $\mathcal{PC}(b)$;
5        If $\mathcal{PC}(b)$ reaches $2^i$, then bucket $b$ is closed ;
6     end
7     else
        /* $b$ is closed                                 */
8        Create two new buckets $b_1, b_2$ in $S_i$, where $b_1$ is the left child of $b$ and $b_2$ is the right child of $b$. Initialize $\mathcal{PC}(b_1)$ and $\mathcal{PC}(b_2)$ to zero.;
9        If $y \in span(b_1)$, then increment $\mathcal{PC}(b_1)$. Otherwise increment $\mathcal{PC}(b_2)$.;
        /* Check for overflow.             */
10        if *Number of buckets in $S_i$ is greater than $\alpha$* then
11           Let $b'$ be the bucket in $S_i$ with the largest value of $left(b')$;
12           Discard $b'$ from $S_i$;
13           Update $T_i \leftarrow left(b')$;
14        end
15     end
16 end

FIG. 3

Process 3: When an estimate for $COUNT(y)$ is required.

1. Let $\ell$ be the smallest level such that $T_\ell > y$;
2. Within $S_\ell$, let $B_y$ be the set of all buckets $b$ such that $span(b) \subseteq [0, y]$;
3. Return $\sum_{b \in B_y} est(\mathcal{PC}(b))$;

FIG. 4

| Process 4 | : General Function: Initialization |
|---|---|
| 1 | $S_0 \leftarrow$ null set $\phi$; $Y_0 \leftarrow \infty$; |
| 2 | for $l$ *from 1 to* $l_{max}$ do |
| 3 | $\quad S_l$ is a set with a single element $\langle sk_f(\cdot,\cdot,\phi), 0, y_{max} \rangle$; |
| 4 | $\quad Y_l \leftarrow \infty$; |
| 5 | end |

FIG. 5

Process 5: When an element $(x, y)$ arrives

1 if *There is a bucket $b$ in $S_0$ such that $y \in span(b)$* then
2     Update $k(b)$ by inserting $x$.
3 end
4 else
5     Initialize a bucket $b = \langle sk_f(v, \gamma, \{x\}), y, y \rangle$, and insert $b$ into $S_0$;
6     if $|S_0| > \alpha$ then
7        Discard the bucket $b \in S_0$ with the largest value of $l(b)$, say $b^*$, and update $Y_0 \leftarrow \min\{Y_0, l(b^*)\}$.
8     end
9 end
    // levels $i > 0$
10 for *$i$ from 1 to $\ell_{max}$* do
11     if $Y_i \leq y$ then
12        return
13     end
14     Let $b$ be the bucket in $S_i$ such that $b$ is a leaf and $y \in span(b)$;
15     if *$b$ is open* then

FIG. 6A

```
16        Insert x into k(b);
17        if (est(k(b)) ≥ 2^{i+1}) and (l(b) ≠ r(b)) then
18           close bucket b
19        end
20     end
21   else
22     Store two buckets b_1, b_2 in S_i, where b_1 is the
       left child of b and b_2 is the right child of b.
       Initialize k(b_1) = k(b_2) = sk_f(ν, γ, φ).
23     If y ∈ span(b_1) then insert x into k(b_1).
       Otherwise insert x into k(b_2);
       /* Check for overflow                      */
24     if |S_i| ≥ α then
25        Let b' be the bucket in S_i with the largest
          value of attribute l().:
26        Discard b' from S_i;
27        Update Y_i ← l(b').
28     end
29   end
30 end
```

FIG. 6B

Process 6 : When there is a query for $f(S, c)$

1  Let $\ell \in [0, \ldots, \ell_{max}]$ be the smallest level such that $Y_\ell > c$. If no such level exists, output FAIL.
2  if $\ell$ *is 0* then
3      Answer the query using $S_0$ by summing over appropriate singletons
4  end
5  else
6      Let $B_1^\ell$ be the set of all buckets $b$ in level $\ell$ such that $span(b) \subseteq [0, c]$;
    // Compose the Sketches
7      Let $K$ be the composition of all sketches in $\{k(b) | b \in B_1^\ell\}$
8      Return $est(K)$, the estimate of $f(B_1^\ell)$ gotten using the sketch $K$.
9  end

FIG. 7

COMPUTING CORRELATED AGGREGATES OVER A DATA STREAM

STATEMENT OF GOVERNMENT INTEREST

This invention was made with government support under grant numbers CNS0834743 and CNS0831903, awarded by the National Science Foundation. The government has certain rights in the invention.

FIELD OF THE INVENTION

The subject matter presented herein generally relates to efficiently computing correlated aggregates over a data stream.

BACKGROUND

Processing a massive data set presented as a large data stream is challenging. The data set may be, for example, network traffic data or streaming data from external memory. A difficulty encountered is that the data set is too large to store in cache for analysis. Because of the size of the data set, processing requires fast update time, use of very limited storage, and possibly only a single pass over the data.

In computing statistics for certain types of data set analysis, a problem is the correlated aggregate query problem. Here, unlike in traditional data streams, there is a stream of two dimensional data items (i,y), where i is an item identifier, and y is a numerical attribute. A correlated aggregate query requires first applying a selection predicate along the y dimension, followed by an aggregation along the first dimension. An example of a correlated query is: "On a stream of IP packets, compute the k-th frequency moment of all the source IP address fields among packets whose length was more than 100 bytes". Answering such a query may for example allow a network administrator to identify IP addresses using an excessive amount of network bandwidth.

BRIEF SUMMARY

One aspect provides a method for summarizing attributes of data elements of a data set for computing correlated aggregates, comprising: receiving a stream of data elements at a device, each data element having at least one numerical attribute; maintaining in memory a plurality of tree structures comprising a plurality of separate nodes for summarizing numerical attributes of the data elements with respect to a predicate value of a correlated aggregation query, said maintaining comprising: creating the plurality of tree structures in which each node implements one of: a probabilistic counter and a sketch, wherein said probabilistic counter and said sketch each act to estimate aggregated data element numerical attributes to form a summary of said numerical attributes; and responsive to a correlated aggregation query specifying said predicate value, using said plurality of tree structures as a summary of said data element numerical attributes to compute a response to said correlated aggregate query.

Another aspect provides a computer program product for summarizing attributes of data elements of a data set for computing correlated aggregates, comprising: a computer readable storage medium having computer readable program code embodied therewith, the computer readable program code comprising: computer readable program code configured to receive a stream of data elements at a device, each data element having at least one numerical attribute; computer readable program code configured to maintain in memory a plurality of tree structures comprising a plurality of separate nodes for summarizing numerical attributes of the data elements with respect to a predicate value of a correlated aggregation query, wherein to maintain further comprises: computer readable program code configured to create the plurality of tree structures in which each node implements one of: a probabilistic counter and a sketch, wherein said probabilistic counter and said sketch each act to estimate aggregated data element numerical attributes to form a summary of said numerical attributes; and computer readable program code configured to, responsive to a correlated aggregation query specifying said predicate value, use said plurality of tree structures as a summary of said data element numerical attributes to compute a response to said correlated aggregate query.

A further aspect provides a system for summarizing attributes of data elements of a data set for computing correlated aggregates, comprising: at least one processor; and a memory device operatively connected to the at least one processor; wherein, responsive to execution of program instructions accessible to the at least one processor, the at least one processor is configured to: receive a stream of data elements at a device, each data element having at least one numerical attribute; maintain in memory a plurality of tree structures comprising a plurality of separate nodes for summarizing numerical attributes of the data elements with respect to a predicate value of a correlated aggregation query, wherein to maintain further comprises: create the plurality of tree structures in which each node implements one of: a probabilistic counter and a sketch, wherein said probabilistic counter and said sketch each act to estimate aggregated data element numerical attributes to form a summary of said numerical attributes; and responsive to a correlated aggregation query specifying said predicate value, use said plurality of tree structures as a summary of said data element numerical attributes to compute a response to said correlated aggregate query.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIGS. 2-4 illustrate an example of processing to provide an estimate for a COUNT correlated aggregation.

FIGS. 5-7 illustrate an example of processing to provide an estimate for general correlated aggregations.

DETAILED DESCRIPTION

Figure 1:
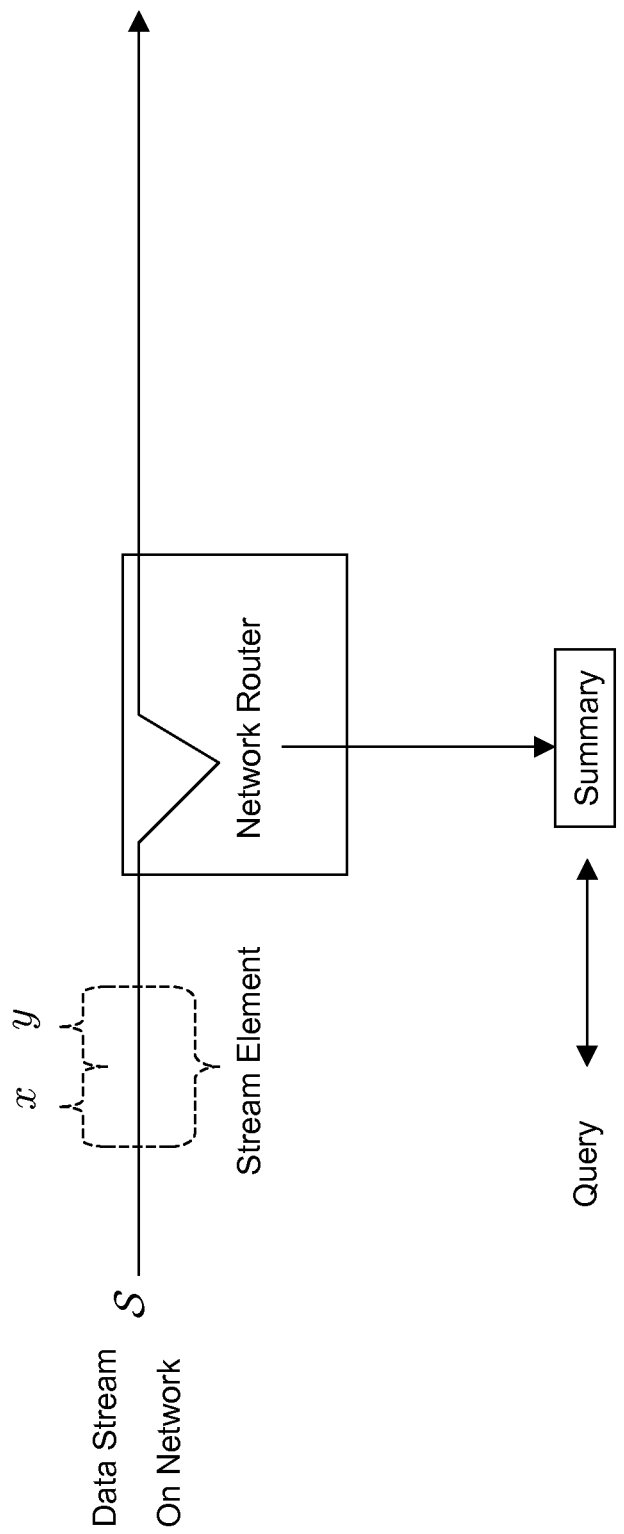
FIG. 1 illustrates an example operating environment for correlated aggregation queries.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

On a stream of two dimensional data items (i,y) where i is an item identifier, and y is a numerical attribute, a correlated aggregate query requires applying a selection predicate first along the second dimension, y, followed by an aggregation along the first dimension. For selection predicates of the form (y<c) or (y>c), where parameter c is provided at query time, embodiments provide streaming processing and lower bounds for estimating statistics of the resulting substream of elements that satisfy the predicate.

For example, an embodiment can answer the following query: "On a stream of IP packets, compute the k-th frequency moment $F_k$ (k=0, 1, 2 or greater) of all the source IP address fields among packets whose length was more than 100 bytes". A process according to an embodiment for $F_1$ (basic count) improves previous approaches by roughly a logarithmic factor and is near-optimal. An approach provided according to embodiments for k≠1 provides the first sublinear space algorithms in this model for these problems. Embodiments also estimate heavy hitters, rarity, and similarity in this model. The memory requirements are significantly smaller than existing linear storage schemes for large data sets, and embodiments simultaneously achieve fast per-record processing time.

The description now turns to the figures. The illustrated example embodiments will be best understood by reference to the figures. The following description is intended only by way of example and simply illustrates certain example embodiments representative of the invention, as claimed.

Referring to FIG. 1, consider a data stream (data set/stream are used interchangeably herein) of tuples $S=(x_i,y_i)$ i=1 ... n, where $x_i$ is an item identifier, and $y_i$ a numerical attribute. A correlated aggregate query $C(\sigma,AGG,S)$ specifies two functions, a selection predicate σ along the y dimension. It requires that the selection be applied first on stream S, followed by the aggregation. More formally, $$C(\sigma,AGG,S)=AG\{x_i|\sigma(y_i)\text{is true}\}$$

Importantly, the selection predicate σ need only be completely specified at query time, and may not be known when the stream is being observed. For example, on a stream of IP packets, with x denoting the source IP address, and y denoting the number of bytes in the packet, on an observed packet stream, a network administrator may ask the query: "What is the second frequency moment ($F_2$) of all IP addresses for those packets that are less than 1000 bytes"? The selection predicate σ=(y<1000) is completely specified only at query time, giving the network administrator flexibility to perform further queries based on the result of previous queries. For example, if the answer for the above query was "interesting" (however defined), the network administrator may then refine the next query further by asking for the same aggregate, but giving a different selection predicate, for example σ=(y<500). Note that with this framework, the network administrator could form the query: "What is the $F_2$ of all IP addresses for those packets whose packet size is smaller than the mean packet size of the stream", by first determining the mean packet size, say μ, using an aggregated query with section predicate y<μ.

A traditional data stream summary provides an accurate answer to an aggregate query, such as frequency moments, quantiles, and heavy-hitters, over the entire data stream. In contrast, a summary for correlated aggregate provides accurate answers to a family of queries that can be posed on the stream, where different queries in the family specify the same aggregation function, but over different subsets of the input stream. These subsets are selected by the predicate along the primary dimension. Correlated aggregates arise naturally in analytics on multi-dimensional streaming data, and space-efficient methods for implementing such aggregates are useful in streaming analytics systems such as in IBM SYSTEM S.

The summaries for correlated aggregates provided by embodiments allow for more flexible interrogation of the data stream than is possible with a traditional stream summary. For example, consider a data stream of IP flow records, such as those output by network routers equipped with CISCO netflow. Suppose that one is interested in only two attributes per flow record, the destination address of the flow, and the size (number of bytes) of the flow. Using a summary for correlated aggregate AGG, along with a quantile summary for the y dimension (any well known stream quantile summaries may be used), it is possible for a network administrator to execute the following sequence queries on the stream:

(1) First, the quantile summary can be queried to find the median size of the flow. (2) Next, using the summary for correlated aggregates, the network administrator can query the aggregate AGG of all those flow records whose flow size was more than the median flow size. (3) If the answer to query (2) was abnormal in the network administrator's opinion, and the network administrator needed to find properties of the very high volume flows, this may be accomplished by querying for the aggregate of all those flow records whose flow size is in, for example, the 95 percent quantile or above (the 95 percent quantile may be found using the quantile summary).

Thus, a summary that allows for such queries can be used for deeper investigation of larger data streams. Important to this is the flexibility that the parameter for the selection predicate can be specified at query time, which allows the user to iteratively adapt his or her query based on the results of previous queries. For data-intensive analytics systems, such as network management systems and sensor data management, this can be a very powerful tool.

In this description, both processing and lower bounds for summarizing data streams for correlated aggregate queries are provided. Embodiments consider selection predicates of the form ($y \leq y_0$) or ($y \geq y_0$), where $y_0$ is specified at query time.

Estimation of Basic Count ($F_1$)

For estimating the basic count, the x values of the stream elements (x,y) do not matter, hence only considered is the stream $Y=y_1, y_2, \ldots, y_n$. The $y_i$'s may not be distinct, and do not necessarily arrive in increasing order. The problem is to design a summary that can answer the following query: given a parameter y provided at query time, how many $y_i$'s are less than or equal to y? In other words, estimate COUNT(y)= $|\{y_i \in Y | y_i < y\}|$. Given user parameters $\epsilon, 0<\epsilon<1$ and $\delta, 0<\delta<1$, an embodiment seeks an answer that is within an $\epsilon$ relative error of the exact answer with probability at least $1-\delta$.

The starting point for a solution is the "splittable histogram" data structure of prior work. This data structure stores histograms at multiple levels, i=0, 1, 2, ..., such that the error due to using a data structure at level i is proportional to $2^i$, but as i increases, the set of possible queries that can be answered by the data structure at level i also become larger. The rough intuition here is that if a data structure is used at a large level (a large value of i), though the error is large (proportional to $2^i$), the answer must also be large, hence the relative error is controlled.

It is noted that that the data structures in prior work use many counters that may need to hold very large values. Observe that these counts need not be exact, and hence an embodiment uses probabilistic counters, which provide approximate counts of large numbers using significantly smaller space than exact counters. The error in the counters and the error in the data structures combine to give the total error in the estimate.

There is a technical difficulty in getting the above idea to work, which is that the states of the counters are used to trigger certain actions of the data structures, such as the formation of new nodes in the data structure. Replacing these counters with probabilistic counters leads to dealing with random variables and events that are not all independent of each other, and this dependency has to be handled carefully. Presented herein are further details of the process for doing this and the analysis.

Probabilistic Counters

A probabilistic counter is a data structure for approximate counting that supports two operations: increment and query. For positive integer M and $\gamma>0$, let PC(M,$\gamma$) denote a probabilistic counter with base $(1+\gamma)$, that counts until a maximum estimated value of M. Let $C_n$ denote the state of the counter after n increment operations. Using $C_n$, it is possible to return an estimate $\hat{n}$ of n. If $\hat{n} \geq M$, the counter cannot be incremented any further, and the counter is said to be "closed". If $\hat{n}<M$, then the bucket is said to be "open".

Theorem 1:

Let $\hat{n}$ denote the estimated count returned by the counter PC(M,$\gamma$) after n increments. Then $$E[\hat{n}] = n, \text{ and } VAR[\hat{n}] = \frac{\gamma n(n+1)}{2}.$$

The counter can be stored in space no more than $$\left(\log \log M + \log \frac{1}{\gamma}\right)$$

bits.

The above theorem concerns the estimates returned by the probabilistic counter. The number of increments needed for the counter to reach its maximum value need to be analyzed, so a slightly different type of guarantee is required.

Lemma 1:

For C=PC(M,$\gamma$), let I(C) denote the number of insertions into C that causes it to be closed. Then E[I(C)]=M+1, and $$VAR[I(C)] = \frac{\gamma M(M+1)}{2}.$$

The proof of this lemma is in the appendix.

Data Structure

The data structure consists of histograms $S_0, S_1, \ldots, S_{l_{max}}$, where $l_{max}=\log(2\epsilon U)$, where U is an upper bound on the value of COUNT(y) for any value of y. Each histogram $S_i$ consists of no more than $$\alpha = \frac{4(\log y_{max} + 1)}{\epsilon}$$

buckets.

Each bucket $b \in S_i$ is a probabilistic counter $$PC\left(2^i+1, \frac{\epsilon^2 \delta}{\alpha}\right).$$

The buckets form a rooted binary tree, where each internal node has exactly two children. The tree in $S_i$ is stored within an array by keeping the nodes of the tree in in-order traversal of the tree. This is unambiguous, by storing within each bucket an additional bit that says whether the bucket is a leaf in the tree, or an internal node.

Every bucket is responsible for a range of y values, which is represented implicitly by the position of the bucket in the tree. The "span" of a bucket b is the range of timestamps that the bucket b is responsible for. The span of the root of the tree is $[0, y_{max}]$. If the span of node v is $[y_1, y_2]$, then the span of its left child is $[y_1, (y_1+y_2-1)/2]$, and the span of its right child is $[(y_1+y_2+1)/2, y_2]$. In a given level l, the span of all buckets at the same depth in the tree are disjoint, but the span of buckets at different depth may overlap with each other. If they do overlap, then the span of one of the buckets must be a proper subset of the span of the other (overlapping) bucket. Each bucket has a probabilistic counter associated with it.

For bucket b, let span(b) denote the span of the bucket. Let left(b) denote the leftmost endpoint of span(b), and right(b) denote the rightmost endpoint of span(b). Let PC(b) to denote the counter associated with the bucket. The process for COUNT is illustrated in FIGS. 2-4.

Lemma 2:

The space complexity of the data structure for $F_1$ is $$O\left(\frac{1}{\epsilon}(\log \epsilon U)(\log y_{max})\left(\log \log U + \log \frac{1}{\epsilon} + \log \frac{1}{\delta}\right)\right)$$

bits, where U is an upper bound on the value of COUNT(y). If $\log(y_{max})=\Theta(\log(U))$, then for constant $\epsilon$ and $\delta$, the space complexity is $O(\log^2 U \log \log U)$.

Proof: The space complexity is the space taken to store $O(l_{max}\alpha)$ buckets. Each bucket b consists of a probabilistic counter PC(M,$\epsilon^2\delta/\alpha$), where the value of M is no more than U. The space complexity of the data structure follows from Theorem 1.

Definition 1: For $l=0 \ldots l_{max}$, level $l$ is defined to be incomplete for query y if $T_l < y$. If $T_l \geq y$, then level l is said to be complete for query y.

For bucket b, let A(b) denote the number of stream items that were inserted into this bucket. Let EST (b) denote the current estimate of the number of items that were inserted into the bucket. This notation is extended to sets of buckets too. For any set of buckets B, all in the same level, let $$A(B) = \sum_{b \in B} A(b),$$

and let $$\mathcal{EST}(B) = \sum_{b \in B} \mathcal{EST}(b).$$

Lemma 3

Let $I_l$ be any set of internal nodes in $S_l$. Then EST $(I_l) = 2^l |I_l|$, $E[A(I_l)] = 2^l |I_l|$, and $$Pr[|A(I_l) - EST(I_l)| > \epsilon EST(I_l)] < \frac{\delta}{2|I_l|}.$$

Proof: For any $b \in I_l$, there is EST(b)=$12^l$. Since $$EST(I_l) = \sum_{b \in I_l} EST(b),$$

it follows that $EST(I_l) = 2^l |I_l|$. Further, $A(b) = I(PC(2^l-1, \gamma))$. From Lemma 1, there is $E[A(b)] = 2^l$, and $$VAR[A(b)] = \frac{\gamma 2^l (2^l - 1)}{2}.$$

$$A(I_l) = \sum_{b \in I_l} A(b)$$

Using linearity of expectation yields:

$$E[A(I_l)] = \sum_{b \in I_l} E[A(b)] = 2^l |I_l|$$

For each bucket $b \in I_l$, $$Pr[|A(b) - 2^l| > \epsilon 2^l] \leq \frac{VAR[A(b)]}{\epsilon^2 2^{2l}} \leq \frac{\gamma}{2\epsilon^2}$$

Using a union bound over all the buckets, and using $$\gamma = \frac{\epsilon^2 \delta}{\alpha},$$

the desired result is obtained.

Lemma 4:

Let L be any set of leaves in $S_l$, Then $E[EST(L)] = A(L)$, and $$Pr[|EST(L) - A(L)| > \epsilon A(L)] < \delta$$

Proof: For any $b \in L$, there is $E[EST(b)] = A(B)$, from Theorem 1. Using Linearity of Expectation, $$E[EST(L)] = E\left[\sum_{b \in L} EST(b)\right]$$

$$= \sum_{b \in L} E[EST(b)]$$

$$= \sum_{b \in L} A(b) = A(L)$$

For the leaves, after the actual counts A(b)'s have been assigned, the random variables EST(b)'s are all independent. Hence:

$$VAR[EST(L)] = \sum_{b \in L} VAR[EST(b)]$$

$$= \sum_{b \in L} \frac{\gamma A(b)(A(b)+1)}{2}$$

$$= \frac{\gamma}{2}\left(A(L) + \sum_{b \in L} A^2(b)\right)$$

$$\leq \frac{\gamma}{2}(A(L) + A^2(L)) \leq \gamma A^2(L)$$

Applying Chebyshev's inequality:

$$Pr[|EST(L) - A(L)| > \epsilon A(L)] \leq \frac{VAR[EST(L)]}{\epsilon^2 A^2(L)} \leq \frac{\gamma}{\epsilon^2} < \delta$$

Lemma 5:

If level l is incomplete for query y, then with probability at least $$1 - \frac{\delta}{\alpha - 1},$$

COUNT(y) $\geq (1-\epsilon) 2^{l-1}(\alpha - 1)$.

Proof: Since $T_l \leq y$, for each bucket $b \in S_l$, it must be true that right(b)<y. Thus each item that was inserted into bucket b in $S_l$ must be contained in query y. Let $S_l^1$ denote the internal nodes in $S_l$.

COUNT(y) $\geq A(S_l) \geq A(S_l^1)$

Using Lemma 3, the following is true with probability at least $$1 - \frac{\delta}{2|S_l^1|}.$$

$A(S_l^1) \geq (1-\epsilon) E[EST(S_l^1)] = (1-\epsilon) 2^l |S_l^1|$

Since $S_l$ is a binary tree with $\alpha$ nodes, there are $(\alpha-1)/2$ nodes in $S_l^1$. Thus, $$Pr[COUNT(y) > (1-\epsilon)(\alpha-1) 2^{l-1}] > 1 - \frac{\delta}{\alpha - 1}$$

Lemma 6:

The estimate returned for COUNT(y) by process 3 has a relative error of less than $7\epsilon$ with probability at least $1-4\delta$.

Proof: Suppose the process uses level l for its estimate. Let $B_1 \subseteq S$ denote the set of all nodes $b \in S_l$ such that the span of b is a subset of [0,y]. The estimator uses the sum of the estimated counts of all nodes in $B_1$. Let $B_1^I \subseteq B_1$ denote the internal nodes in $B_1$, and $B_1^L \subseteq B_1$ denote the leaves in $B_1$. Let $\widehat{COUNT}(y)$ denote the estimate returned by the process. Let $B_2 \subseteq S_l$ denote the set of all buckets $b \in S_l$ such that the span of b intersects [0,y], but is not a subset of [0,y].

$$\widehat{COUNT}(y) = EST(B_1) = EST(B_1^I) + EST(B_1^L)$$

$$A(B_1) \leq \widehat{COUNT}(y) \leq A(B_1) + A(B_2) \tag{1}$$

The following events are defined:

$\epsilon_1$ is $A(B_2) \leq (1+\epsilon)(\log y_{max})2^l$ $\epsilon_2$ is $\widehat{COUNT}(y) \geq (1-\epsilon)2^{l-1}(\alpha-1)$ $\epsilon_3$ is $EST(B_1^I) \geq (1-\epsilon)A(B_1^I)$ $\epsilon_4$ is $EST(B_1^L) \geq (1-\epsilon)A(B_1^L)$ First consider $\epsilon_1$. Bounding $A(B_2)$, each bucket in $B_2$ must span y. There can be no more than $\log y_{max}$ buckets in $S_l$ that can span y, and each such bucket, except for the smallest bucket, must be an internal node of $S_l$. Let $f_2$ denote the leaf bucket in $B_2$, if it exists (note that $f_2$ may not exist). Let $B_2'$ denote the internal buckets in $B_2$. If $f_2$ does not exist, then $A(f_2)$ is defined to be 0.

$$A(B_2) = A(f_2) + A(B_2')$$

From Lemma 3, $E[A(B_2')] = 2^l |B_2'|$, and $$Pr[A(B_2') > (1+\epsilon)2^l |B_2'|] < \frac{\delta}{2|B_2'|} \tag{2}$$

Next, it is shown that $A(f_2)$ is small, with high probability. If $f_2$ does not exist, then $A(f_2)=0$, so it can be assumed that $f_2$ exists. In such a case, $f_2$ cannot be a singleton bucket, since then its span would have been completely contained within [0,y]. Consider $I(f_2)$, which is the number of stream items that need to be inserted into $f_2$ to close the counter. From Lemma 3: $Pr[|Y(f_2) - 2^l| > \epsilon 2^l] \leq \delta$. Thus, with probability at least $(1-\delta)$, it must be true that $Y(f_2) < (1+\epsilon)2^l$. Consequently:

$$Pr[A(f_2) > (1+\epsilon)2^l] \leq \delta \tag{3}$$

Let $\epsilon_5$ denote the event $A(B_2') \leq (1+\epsilon)2^l |B_2'|$ and $\epsilon_6$ denote the event $A(f_2) > (1+\epsilon)2^l$. From Equations 2 and 3:

$$Pr[\mathcal{E}_5 \wedge \mathcal{E}_6] \geq 1 - Pr[\overline{\mathcal{E}_5}] - Pr[\overline{\mathcal{E}_6}] \geq 1 - \delta - \frac{\delta}{2|B_2'|} \geq 1 - 1.5\delta$$

Since $|B_2'| < \log y_{max}$, $Pr[A(B_2) > (1+\epsilon)(\log y_{max})2^l] < 1.5\delta$. Thus:

$$Pr[\epsilon_1] > 1 - 1.5\delta \tag{4}$$

From Lemma 5:

$$Pr[\mathcal{E}_2] \geq 1 - \frac{\delta}{\alpha - 1} \tag{5}$$

Since $B_1^I$ is a set of internal nodes in $S_l$, from Lemma 3, $$Pr[\mathcal{E}_3] = Pr\left[\mathcal{EST}(B_1^I) \geq (1-\epsilon)A(B_1^I) \geq \frac{A(B_1^I)}{1+\epsilon}\right] \geq 1 - \frac{\delta}{2}.$$

Thus:

$$Pr[\mathcal{E}_3] \geq 1 - \frac{\delta}{2} \tag{6}$$

From Lemma 4, $$Pr[\epsilon_4] > 1 - \delta \tag{7}$$

Suppose that $\epsilon_1, \epsilon_2, \epsilon_3, \epsilon_4$ were true. From Equations 4-7, this is true with probability at least $$1 - \delta - 0.5\delta - 1.5\delta - \frac{\delta}{\alpha - 1} \geq 1 - 4\delta.$$

$$\widehat{COUNT}(y) = EST(B_1^I) + EST(B_1^L) \tag{8}$$

$$\geq (1-\epsilon)A(B_1^I) + (1-\epsilon)A(B_1^L) \tag{9}$$

$$\geq (1-\epsilon)A(B_1) \tag{10}$$

$$\widehat{COUNT}(y) \leq A(B_1) + A(B_2) \leq A(B_1) + (1+\epsilon)(\log y_{max})2^l,$$

since $\epsilon_1$ is true. This is at most $$A(B_1) + \widehat{COUNT}(y) \frac{(1+\epsilon)2^l \log y_{max}}{(1-\epsilon)2^{l-1}(\alpha-1)},$$

since $\epsilon_2$ is true. This equals $$A(B_1) + \frac{\epsilon(1+\epsilon)}{2(1-\epsilon)} \widehat{COUNT}(y),$$

using $$\alpha = \frac{4}{\epsilon}(\log y_{max} + 1).$$

If $\epsilon \leq \frac{1}{2}$, then $$\frac{1}{1-\epsilon} \leq (1+2\epsilon),$$

and thus $$\frac{1+\epsilon}{1-\epsilon} \leq (1+2\epsilon)(1+\epsilon) \leq (1+4\epsilon)$$

$$\widehat{COUNT}(y) \leq A(B_1) + \frac{(\epsilon + 4\epsilon^2)}{2} \widehat{COUNT}(y)$$

$$\leq A(B_1) + \frac{3\epsilon}{2} \widehat{COUNT}(y)$$

where $\epsilon \leq \frac{1}{2}$ was used.

$$\text{COUNT}(y) \leq \frac{A(B_1)}{1 - 1.5\epsilon} \leq (1 + 6\epsilon)A(B_1) \qquad (11)$$

From Equations 11 and 8:

$$\widehat{\text{COUNT}}(y) \geq \frac{1-\epsilon}{1+6\epsilon}\text{COUNT}(y)$$

$$\geq (1-\epsilon)(1-6\epsilon)\text{COUNT}(y)$$

$$\geq (1-7\epsilon)\text{COUNT}(y)$$

This proves that the estimate is within a $7\epsilon$ relative error of COUNT. The other direction is proved similarly, by noting the following:

$$\widehat{\text{COUNT}}(y) = EST(B_1^I) + EST(B_1^L)$$

$$\leq \frac{B_1^I}{1-\epsilon} + (1+\epsilon)B_1^L$$

$$\leq (1+2\epsilon)B_1^I + (1+\epsilon)B_1^L \text{ Using } \epsilon \leq 1/2$$

$$\leq (1+2\epsilon)B_1$$

$$\leq (1+2\epsilon)\text{COUNT}(y) \text{ Using Equation 1}$$

Thus, with probability at least $1-4\delta$, the estimated count is within a $7\epsilon$ relative error of the actual.

Theorem 2:

processes 1-3 yield an $(\epsilon,\delta)$-approximation for the correlated basic count, using space (in bits)

$$O\left(\frac{1}{\epsilon}(\log^2 U)(\log\log U + \log(1/\epsilon) + \log(1/\delta))\right).$$

The space complexity is within a factor of $O(\log\log U + \log(1/\epsilon) + \log(1/\delta))$ of the optimal. The amortized processing time per record can be made $O(\log n)$. In the above expression, it is assumed that $\log(y_{max}) = O(\log U)$.

Proof: The space complexity and correctness follow from Lemma 2 and Lemma 6, respectively. In prior work, it was shown that any data structure for basic counting for a (synchronous) sliding window with an $\epsilon$ relative error needs $$\Omega\left(\frac{\log^2 U}{\epsilon}\right)$$

bits of space. Since basic counting over a synchronous sliding window is a special case of correlated basic count estimation, the space lower bound of $$\Omega\left(\frac{\log^2 U}{\epsilon}\right)$$

holds here too. Hence, the achieved space bound is within a factor of $O(\log\log U + \log(1/\epsilon) + \log(1/\delta))$ of the optimal. To achieve $O(\log n)$ amortized processing time, observe that there are $O(\log n)$ data structures $S_0, S_1, \ldots, S_{l_{max}}$, each containing $O(\epsilon^{-1} \log n)$ buckets, each containing a probabilistic counter. These probabilistic counters are packed into words of size $\Theta(\log n)$, that is, the standard RAM model. Processing a batch of $O(\epsilon^{-1} \log n)$ counts together as follows. First, the batch is sorted in order of non-decreasing y-coordinate. This can be done in $O(\epsilon^{-1} \log n(\log 1/\epsilon + \log\log n))$ time. Then the following for each $S_i$ is done, sequentially, so as to keep within the space bound. For data structure $S_i$, unpack it, putting each probabilistic counter into a word. This can be done in $O(\epsilon^{-1} \log^2 n)$ bits of space and $O(\epsilon^{-1} \log n)$ time. Further, the data structure is unpacked and represented as a list in a pre-order traversal of the tree that $S_i$ represents. Then, an embodiment walks through the list and updates the appropriate buckets. Since the updates are sorted in increasing y-value and the list is represented as a pre-order traversal, this can be done in $O(\epsilon^{-1} \log n)$ time. Hence, as an embodiment ranges over all $S_i$, the total processing time is $O(\epsilon^{-1} \log n(\log 1/\epsilon + \log\log n + \log n)) = O(\epsilon^{-1} \log^2 n)$, or equivalently, the amortized update time is $O(\log n)$.

General Scheme for Correlated Aggregation

A general scheme for constructing a summary for correlated aggregation for any aggregation function that satisfies a certain set of properties is described. For any such aggregation function, it is described how to reduce the construction of a sketch for correlated aggregation to the construction of a sketch for aggregation over the entire stream. This reduction allows the use of previously known stream summaries for aggregation over streams in constructing summaries for correlated aggregation.

An embodiment employs this scheme to construct small space summaries for estimating correlated frequency moments over a data stream. For $k>0$, the k-th frequency moment of a stream of identifiers, each assumed to be an integer from $\{1, \ldots, m\}$, is defined as $F_k = \Sigma_{i=1}^m f_i^k$, where $f_i$ is the number of occurrences of the i-th item. The estimation of the frequency moments over a data stream has been the subject of much study; however, embodiments provide processing for estimating the correlated frequency moments with provable guarantees on the relative error. The memory requirements are optimal up to small factors, namely factors that are logarithmic in m and the error probability $\delta$, and factors that are polynomial in the relative error parameter $\epsilon$.

The technique for general correlated aggregation described herein builds on prior work for the correlated estimation of the basic count. While the basic data structure used in prior work is an exact counter, embodiments rather employ a "sketch", which can accurately estimate an aggregate on a stream, and provide a (possibly) probabilistic guarantee on the correctness. The error due to the randomized sketches employed by embodiments is analyzed, as well as the combination of different sketches. A central new issue is that of dependency between random variables.

Also presented in detail are approaches for the first space-efficient processing for correlated aggregates of the number of distinct elements ($F_0$), and other aggregates related to frequency moments, such as the $F_k$-heavy hitters and rarity. A technique for achieving lower amortized update time is provided. For correlated $F_2$, the update time is $\tilde{O}(\log n)$ per stream update.

General Streaming Models and Lower Bounds

The case of streams where items can have an associated positive or negative integer weight is described. Allowing negative weights is useful for analyzing the symmetric difference of two data sets, since the items in the first data set can be inserted into the stream with positive weights, while the items from the second data set can be inserted into the stream with negative weights.

In this model, each stream element is a 3-tuple $(x_i, y_i, z_i)$, where $z_i$ specifies the weight of the item. It is shown that even if $z_i \in \{-1,1\}$ for all i, then for a general class of functions that includes the frequency moments, any summary that can estimate correlated aggregates accurately and that is constructed in a single pass must use memory that is linear in the size of the stream. This is to be contrasted with the estimation of frequency moments over a stream in the non correlated case, where it is known how to estimate these aggregates in sublinear space even in the presence of positive and negative weights.

Also described is a model with arbitrary positive and negative weights in which multiple passes over the stream are allowed. This more general model allows the processing to make a small (but more than one) number of passes over the stream and store a small summary of what is seen. At a later time a query is made and must be answered using only the summary. Such a setting arises if data is collected and stored from previous days for the purpose of creating a summary, but is then deleted or archived while only the summary is retained.

In this case, a smooth pass-space tradeoff is obtained for these problems, in that with a logarithmic number of passes there are space-efficient algorithms for a large class of correlated aggregates even with negative weights, but with fewer passes no such space-efficient algorithms can exist.

Aggregation over Asynchronous Streams

A closely related problem is that of computing aggregates over a sliding window on an asynchronous stream. In this scenario, a stream of $(v_1,t_1)$ tuples, where v is a data item, and t is the timestamp at which it was generated. Due to asynchrony in the transmission medium, it is possible that the stream elements do not arrive in the order of the timestamps. In other words, it is possible that $t_1 < t_2$, but that $(v_1,t_1)$ is received later than $(v_2,t_2)$. This was not possible in the traditional definition of count-based or time-based sliding windows. There is a straightforward reduction from the problem of aggregating over asynchronous streams to that of computing correlated aggregates, and vice versa, from previous work. Hence, all of the results for correlated aggregates described herein apply also to aggregation over a sliding window on an asynchronous stream with essentially the same space and time bounds. Thus, embodiments achieve the first low-space solutions for asynchronous streams for a wide class of statistics.

Correlated Estimation of a Class of Statistics

Embodiments provide for the estimation of correlated aggregates for any aggregation function that satisfies a set of properties. Consider an aggregation function $f$ that takes as input a multi-set of real numbers R and returns a real number $f(R)$. In the following, the term "set of real numbers" is used to mean a "multi-set of real numbers". Also, union of sets implies a multi-set union, when the context is clear.

For any set of tuples of real numbers $T=\{(x_i,y_i)|1 \le i \le n\}$ and real number y, let $f(T,c)$ denote the correlated aggregate $f(\{x_i|((x_i,y_i) \in T) \wedge (y_i \le c)\})$. For any function $f$ satisfying the following properties, it is shown herein how a reduction from the problem of space-efficient estimation of correlated aggregate $f(T,c)$ to the problem of space-efficient estimation of $f$ in an uncorrelated manner on the entire set R.

The following definition of an $(\epsilon,\delta)$ estimator is used herein. Definition 2: Given parameters $\epsilon,\delta$, where $0<\epsilon<1$, and $0<\delta<1$, an $(\epsilon,\delta)$ estimator for a number Y is a random variable X such that with probability at least $1-\delta$, the following is true:

$$(1-\epsilon)Y \le X \le (1+\epsilon)Y.$$

In the following description, the term "sketching function" denotes a compression of the input set with certain properties. More precisely, $f$ has a sketching function $sk_f(v,\gamma,R)$ if:

Using $sk_f(v,\gamma,R)$ it is possible to get an $(v,\gamma)$-estimator of $f(R)$; and For two sets $R_1$ and $R_2$, given $sk(v,\gamma,R)$ and $sk(v,\gamma,R_2)$, it is possible to compute $sk(v,\gamma,R_1 \cup R_2)$.

Many functions $f$ have sketching functions. For instance, the second frequency moment $F_2$ and the k-th frequency moment $F_k$ have sketches due to prior work. In these two examples, the sketching function is obtained by taking random linear combinations of the input.

Embodiments require the following conditions from $f$ in order to construct a sketch for estimating correlated aggregates. These conditions intuitively correspond to "smoothness" conditions of the function $f$, bounding how much $f$ can change when new elements are inserted or deleted from the input multi-set. Informally, the less the function value is sensitive to small changes, the easier it is to apply to estimating correlated aggregates.

I. $f(R)$ is bounded by a polynomial in $|R|$
II. For sets $R_1$ and $R_2$, $f(R_1 \cup R_2) \ge f(R_1)+f(R_2)$
III. There exists a function $c_1^f(\cdot)$ such that for sets $R_1, \ldots R_j$, if $f(R_i) \le \alpha$ for all $i=1 \ldots j$, then: $f(\cup_{i=1}^j R_i) \le c_1^f(j) \cdot \alpha$
IV. For $\epsilon<1$, there exists a function $c_2^f(\epsilon)$ with the following properties. For two sets A and B such that $B \subset A$, if $f(B) \le c_2^f(\epsilon) \cdot f(A)$, then $f(A-B) \ge (1-\epsilon)f(A)$
V. $f$ has a sketching function $sk_f(\gamma,v,R)$ where $\gamma \in (0,1)$ and $v \in (0,1)$.

For any function $f$ with a sketch $sk_f$ with the above properties, it is shown herein how to construct a sketch $sk_f^{cor}(\epsilon,\delta,T)$ for estimating the correlated aggregate $f(T,c)$ with the following properties:

A. Using $sk_f^{cor}(\epsilon,\delta,T)$, it is possible to get an $(\epsilon,\delta)$-estimator of $f(T,c)$ for any real $c>0$
B. For any tuple (x,y), using $sk_f^{cor}(\gamma,\epsilon,T)$, it is possible to construct $sk_f^{cor}(\gamma,\epsilon,T \cup \{(x,y)\})$.

Processing Description

Referring to FIG. 5, let $f_{max}$ denote an upper bound on the value of $f(\cdot,\cdot)$ over all input streams considered. The process (FIGS. 5-7) uses a set of levels $l=0, 1, 2, \ldots, l_{max}$, where $l_{max}$ is such that $2^{l_{max}} > f_{max}$ for any input stream T and real number c. From Property I, it follows that $l_{max}$ is logarithmic in the stream size.

Parameters $\alpha,\gamma,v$ are chosen as follows:

$$\alpha = \frac{64 c_1^f (\log y_{max})}{c_2^f(\epsilon/2)},$$

$$v = \frac{\epsilon}{2},$$

$$\gamma = \frac{\delta}{4 y_{max}(l+1)},$$

where $y_{max}$ is the largest possible y value.

Without loss of generality, assume that $y_{max}$ is of the form $2^\beta 1-1$ for some integer $\beta$. The dyadic intervals within $[0,y_{max}]$ are defined inductively as follows:
(1) $[0,y_{max}]$ is a dyadic interval;
(2) If [a,b] is a dyadic interval and $a \ne b$, then $[a,(a+b-1)/2]$ and $[(a+b+1)/2,b]$ are also dyadic intervals.

Within each level l, from 0 to $l_{max}$, there is a "bucket" for each dyadic interval within $[0,y_{max}]$. Thus, there are $2y_{max}-1$ buckets in a single level. Each bucket b is a triple <k(b),l(b), r(b)>, where [l(b),r(b)] is a dyadic interval that corresponds to a range of y values that this bucket is responsible for, and k(b) is defined below.

When a stream element (x,y) arrives, it is inserted into each level $l=0, \ldots, l_{max}$. Within level l, it is inserted into exactly one bucket, as described in Process 5. For a bucket b in level l, let S(b) denote the (multi-)set of stream items that were inserted into b. Then, $k(b)=sk_f(v,\gamma,S(b))$ is a sketch of S(b).

Within each level, no more than $\alpha$ of the $2y_{max}-1$ buckets are actually stored. In the process, $S_l$ denotes the buckets that are stored in level l. The level $S_0$ is a special level that just consists of singletons. Among the buckets that are not stored, there are two types of buckets, those that were discarded in Process 5 (see the "Check for overflow" comment in Process 5), and those that were never used by the process. The above three types of buckets are termed "stored", "discarded", and "empty", respectively. Note that S(b) is defined for each of these three types of buckets (if b is an empty bucket, then S(b) is defined as the null set $\phi$).

The buckets in $S_l$ are organized into a tree, induced by the relation between the dyadic intervals that these buckets correspond to.

The initialization for the process for a general function is described in Process 4, illustrated in FIG. 5. The update and query processing are described in Processes 5 and 6, illustrated in FIGS. 6(A-B) and 7, respectively.

Theorem 3

(Space Complexity): The space complexity of the sketch for correlated estimation is $$O\left(\frac{c_1^f(\log y_{max}) \cdot (\log f_{max})}{c_2^f\left(\frac{\epsilon}{2}\right)} \cdot len\right),$$

where $$len = \left|sk_f\left(\frac{\epsilon}{2}, \frac{\delta}{4y_{max}(2+\log f_{max})}, S\right)\right|$$

is the number of bits needed to store the sketch.

Proof:

There are no more than $2+\log f_{max}$ levels and in each level l, $S_l$ stores no more than $\alpha$ buckets. Each bucket b contains $sk_f(v,\gamma,S(b))$. The space complexity is $\alpha(2+\log f_{max})$ times the space complexity of sketch $sk_f$. Here it is assumed that the space taken by $sk_f$ is larger than the space required to store l(b) and r(b).

Process Correctness

Let S denote the stream of tuples observed up to a given point. Suppose the required correlated aggregate is $f(S,c)$. Let A be the set $$\{x_i | ((x_i, y_i) \in S) \wedge (y_i \leq c)\}.$$

Thus, $f(S,c)=f(A)$.

For level $l, 0 \leq l \leq l_{max}$, $B_1^l$ and $B_2^l$ are defined as follows. Let $B_1^l$ denote the set of buckets b in level l such that $span(b) \subseteq [0,c]$. Let $B_2^l$ denote the set of buckets b in level l such that $\overline{span(b)} \subseteq [0,c]$, but span(b) has a non-empty intersection with [0,c].

Note that for each level l, $B_1^l$ and $B_2^l$ are uniquely determined once the query $f(S,c)$ is fixed. These do not depend on the actions of the process. This is an important property used, which allows the choice of which buckets to use during estimation to be independent of the randomness in the data structures. Further, note that only a subset of $B_1^l$ and $B_2^l$ is actually stored in $S_l$.

Consider any level $l, 0 \leq l \leq l_{max}$. For bucket b, recall that S(b) denotes the set of stream items inserted into the bucket until the time of the query. For bucket $b \in S_l$, let $f(b)$ denote $f(S(b))$. Let $est_f(b)$ denote the estimate of $f(b)$ obtained using the sketch k(b). If $S(b)=\phi$, then $f(b)=0$ and $est_f(b)=0$. Thus note that $f(b)$ and $est_f(b)$ are defined no matter whether b is a stored, discarded, or an empty bucket. Further, for a set of buckets B in the same level, let $S(B)=\cup_{b \in B} S(b)$, and let $f(B)=f(S(B))$. Let $est_f(B)$ be the estimate for $f(B)$ obtained through the composition of all sketches in $\cup_{b \in B} k(b)$ (by property V, sketches can be composed with each other).

Definition 3: Bucket b is defined to be "good" if $(1-v)f(b) \leq est_f(b) \leq (1+v)f(b)$. Otherwise, b is defined to be "bad".

Let G denote the following event: each bucket b in each level b in each level $0 \ldots l_{max}$ is good.

Lemma 7: $Pr[G] \geq 1 - \frac{\delta}{2}$

Proof:

For each bucket b, note that $est_f(b)$ is a $(v,\gamma)$-estimator for $f(b)$. Thus, the probability that b is bad is no more than $\gamma$. Noting that there are less than $2y_{max}$ buckets in each level, and $l_{max}+1$ levels in total, and applying a union bound, yields:

$$Pr[\overline{G}] \leq 2y_{max}(l_{max}+1) = \frac{\delta}{2}$$

Lemma 8:

For any level l, $S(B_1^l) \subseteq A \subseteq S(B_1^l \cup B_2^l)$.

Proof:

Every bucket $b \in B_1^l$ must satisfy $span(b) \in [0,c]$. Thus every element inserted into $B_1^l$ must belong in A. Hence $S(B_1^l) \subseteq A$. Each element in A has been inserted into some bucket in level l (it is possible that some of these buckets have been discarded). By the definitions of $B_1^l$ and $B_2^l$, an element in A cannot be inserted into any bucket outside of $B_1^l \cup B_2^l$. Thus $A \subseteq S(B_1^l \cup B_2^l)$.

Using Lemma 8 and Condition II on $f$ yields the following for any level l:

$$f(B_1^l) \leq f(A) \leq f(B_1^l \cup B_2^l). \quad (12)$$

Lemma 9:

Conditioned on event G, process 6 does not output FAIL in step 1.

Proof:

Consider $l_{max} \cdot Y_{l_{max}} > c$ if event G occurs. Observe that $Y_{l_{max}}$ is initialized to $\infty$ in Process 4. Its value can only change if the root b of $S_{l_{max}}$ closes. For this to happen, there must be $est(k(b)) \geq 2^{l_{max}+1}$. But $2^{l_{max}+1} > 2f_{max}$, which means that est(k(b)) does not provide a $(1+\epsilon)$-approximation. This contradicts the occurrence of event G. Hence, $Y_{l_{max}} > c$ and so Process 6 does not output FAIL in step 1.

Let l* denote the level used by Process 6 to answer the query $f(S,c)$.

Lemma 10:

If $l^* \geq 1$ and G is true, then $$f(B_2^{l*}) \leq c_1^f(\log y_{max}) 2^{l*+2}.$$

Proof:

First, note that there can be no singleton buckets in $B_2^{l*}$ by definition of $B_2^l$ for a level l. Thus, for each bucket $b \in B_2^{l*}$, $est_f(b) \leq 2^{l*+1}$. Because G is true, for every bucket $b \in B_2^{l*}$, b is good, so that $$f(b) \le \frac{2^{l^*+1}}{1-v}.$$

Next, note that there are no more than $\log y_{max}$ buckets in $B_2^{l^*}$, since there can be only one dyadic interval of a given size that intersects $[0,c]$ but is not completely contained within $[0,c]$.

From Property III:

$$f(B_2^{l^*}) = f\left(\bigcup_{b \in B_2^{l^*}} S(b)\right) \le c_1^f (\log y_{max}) \frac{2^{l^*+1}}{1-v}.$$

Since $v \le \frac{1}{2}$, the desired result is obtained.

Lemma 11:

If $l^* \ge 1$ and G is true, then:

$$f(A) \ge \alpha 2^{l^*-4}.$$

Proof:

Since the process used level $l^*$ for answering the query, it must be the case that there are buckets in $S_{l^*-1}$ that had an intersection with $[0,c]$ but were discarded from the data structure. It follows that there are at most $\log y_{max}$ buckets $b \in S_{l^*-1}$ such that $\text{span}(b) \not\subset [0,c]$. For the remaining buckets $b \in S_{l^*-1}$, it must be true that $\text{span}(b) \subset [0,c]$. If $S_{l^*-1}$ is viewed as a binary tree with $\alpha$ nodes, according to the ordering between the different dyadic intervals, then $S_{l^*-1}$ must have $(\alpha-1)/2$ internal nodes. Suppose I denoted the set of buckets in $b \in S_{l^*-1}$ such that b is an internal node, and $\text{span}(b) \subset [0,c]$. Thus $|I| \ge (\alpha-1)/2 - \log y_{max}$. Since G is true, for any bucket $b \in I$, $$f(b) \ge \frac{2^{l^*-1}}{1+v}.$$

Using property II repeatedly yields:

$$f(A) \ge f(I) \ge \frac{|I|2^{l^*-1}}{1+v}$$

Using $v<1$, and for an appropriately large value of $\alpha$, $((\alpha-1)/2 - \log y_{max}) \ge \alpha/4$. Combining the above yields the following:

$$f(A) \ge \frac{\alpha 2^{l^*}}{2 \cdot 4 \cdot 2} = 2^{l^*-4} \alpha.$$

Theorem 4:

When presented with a query for $f(S,c)$, let est denote the estimate returned by the process. Then, with probability at least $1-\delta$:

$$(1-\epsilon)f(S,c) \le est \le (1+\epsilon)f(S,c).$$

Proof:

If $l^*=0$, then all elements $(x,y) \in S$ such that $y \le c$ are stored in $S_0$. In this case, the theorem follows by the definition of event G and Lemma 1. Otherwise, $est = est_f(B_1^{l^*})$, and $f(S,c) = f(A)$. First, note that in level $l^*$, none of the buckets in $B_1^{l^*}$ have been discarded. Thus each bucket $b \in B_1^{l^*}$ is either empty or is stored. Thus, it is possible to execute line 7 in Process 6 correctly to construct a sketch of $S(B_1^{l^*})$. From property (b) of sketching functions yields a sketch $sk(v, \gamma, S(B_1^{l^*}))$.

Let $\epsilon_1$ denote the event $(1-v)f(B_1^{l^*}) \le est_f(B_1^{l^*}) \le (1+v)f(B_1^{l^*})$. Thus:

$$Pr[\epsilon_1] \ge 1-\gamma$$

The following is conditioned on both $\epsilon_1$ and G occurring. From Equation 1: $f(A) \le f(B_1^{l^*} \cup B_2^{l^*})$. From Lemmas 4 and 5:

$$\frac{f(B_2^{l^*})}{f(A)} \le \frac{c_1^f (\log y_{max}) 2^{l^*+2}}{a 2^{l^*-4}} \le \frac{c_1^f (\log y_{max}) 2^6}{a} \le c_2^f \left(\frac{\epsilon}{2}\right)$$

where the value of $\alpha$ has been substituted.

Since $(A - B_1^{l^*}) \subseteq B_2^{l^*}$, the following is true:

$$\frac{f(A - B_1^{l^*})}{f(A)} \le c_2^f \left(\frac{\epsilon}{2}\right).$$

Using Property IV yields:

$$f(B_1^{l^*}) = f(A - (A - B_1^{l^*})) \ge \left(1 - \frac{\epsilon}{2}\right) f(A)$$

Conditioned on $\epsilon_1$ and G both being true:

$$est_f(B_1^{l^*}) \ge (1-\epsilon/2)(1-v)f(A) \ge (1-\epsilon)f(A)$$

This proves that conditioned on G and $\epsilon_1$, the estimate returned is never too small. For the other direction, note that conditioned on $\epsilon_1$ being true:

$$est_f(B_1^{l^*}) \le (1+v)f(B_1^{l^*}) \le (1+v)f(A) \le (1+\epsilon)f(A)$$

where $f(B_1^{l^*}) \le f(A)$ has been used, and $v < \epsilon$.

To complete the proof of the theorem, note that:

$$\ge 1 - Pr[\overline{G}] - Pr[\overline{\epsilon_1}]$$

$$\ge 1 - \frac{\delta}{2} - \gamma$$

using Lemma 7

$$\ge 1 - \delta \text{ using } \gamma < \delta/2.$$

Frequency Moments $F_k$

The general technique presented herein can yield a data structure for the correlated estimation of the frequency moments $F_k$, $k \ge 2$.

Fact 1: (Hölder's Inequality) For vectors a and b of the same dimension, and any integer $k \ge 1$, $\langle a, b \rangle \le \|a\|_k \cdot \|b\|_{k/(k-1)}$.

Lemma 12:

For sets $S_i$, $i=1 \ldots j$, if $F_k(S_i) \le \beta$ for each $i=1 \ldots j$, then $F_k(\cup_{i=1}^j S_i) \le j^k \beta$.

Proof:

Fact 1, j-dimensional vectors a and b implies that $|\langle a, b \rangle|^k \le \|a\|_k^k \cdot \|b\|_{k/(k-1)}^k$. Setting $b=(1, 1, \ldots, 1)$, it follows that $(a_1 + \ldots + a_j)^k \le j^{k-1}(a_1^k + \ldots + a_j^k)$. Hence, it follows that $$F_k(\cup_{i=1}^j S_i) \le j^{k-1} \sum_{i=1}^j F_k(S_i) \le j^k \beta.$$

Lemma 13:

If $F_k(B) \le (\epsilon/(3k))^k F_k(A)$, then $F_k(A \cup B) \le (1+\epsilon) F_k(A)$.

Proof:

Suppose A and B have support on $\{1, 2, \ldots, n\}$. Let a and b be the characteristic vectors of sets A and B, respectively. Using Fact 1 yields:

$$F_k(A \cup B) = \sum_{i=1}^{n}(a_i+b_i)^k$$

$$= F_k(A) + F_k(B) + \sum_{i=1}^{n}\sum_{j=1}^{k-1}\binom{k}{j}a_i^j b_i^{k-j}$$

$$= F_k(A) + F_k(B) + \sum_{j=1}^{k-1}\binom{k}{j}\sum_{i=1}^{n}a_i^j b_i^{k-j} \le$$

$$F_k(A) + F_k(B) + \sum_{j=1}^{k-1}\binom{k}{j}\left(\sum_{i=1}^{n}(a_i^j)^{k/j}\right)^{\frac{j}{k}}\left(\sum_{i=1}^{n}(b_i^{k-j})^{k/(k-j)}\right)^{\frac{k-j}{k}}$$

$$= F_k(A) + F_k(B) + \sum_{j=1}^{k-1}\binom{k}{j}F_k(A)^{\frac{j}{k}}F_k(B)^{\frac{k-j}{k}}$$

$$\le F_k(A) + F_k(B) + \sum_{j=1}^{k-1}\binom{k}{j}F_k(A)\left(\frac{\epsilon}{3k}\right)^{k-j}$$

$$\le (1+\epsilon/3)F_k(A) + F_k(A)\sum_{j=1}^{k-1}\binom{k}{j}(\epsilon/(3k))^{k-j}$$

$$\le (1+\epsilon/3)F_k(A) + F_k(A)(1+\epsilon/(3k))^k - F_k(A)$$

$$\le (1+\epsilon/3)F_k(A) + F_k(A)(1+2\epsilon/3) - F_k(A)$$

$$\le (1+\epsilon)F_k(A),$$

where $(1+x)^y \le e^{xy}$ was used for all x and y, and $e^z \le 1+2z$ for $z \le \frac{1}{2}$. This completes the proof.

Lemma 14:

If $C \subset D$, and $F_k(C) \le (\epsilon/(9k))^k F_k(D)$, then $F_k(D-C) \ge F_k(D)$.

Proof:

It is know that for any two sets A and B, $F_k(A \cup B) \le 2^k(F_k(A)+F_k(B))$.

$$F_k(D) = F_k((D-C) \cup (C))$$

$$\le 2^k(F_k(D-C)+F_k(C)),$$

which leads to:

$$F_k(D-C) \ge F_k(D)/2^k - F_k(C) \ge ((9k/\epsilon)^k(\frac{1}{2})^k - 1)F_k(C)$$

$$\ge (3k/\epsilon)^k F_k(C).$$

Thus, $F_k(C) \le (\epsilon/3k)^k F_k(D-C)$. Applying Lemma 7 yields $F_k(C \cup (D-C)) \le (1+\epsilon)F_k(D-C)$. Thus, $F_k(D-C) \ge F_k(D)/(1+\epsilon) \ge (1-\epsilon)F_k(D)$.

Theorem 5:

For parameters $0 < \epsilon < 1$ and $0 < \delta < 1$, there is a sketch for an $(\epsilon, \delta)$-estimation of the correlated aggregate $F_k$ on a stream of tuples of total length n, using space $n^{1-2/k} \text{poly}(\epsilon^{-1} \log(n/\delta))$ Proof:

From Lemma 12, $c_1^{F_k}(j) = j^k$. From Lemma 8, $c_2^{F_k}(\epsilon) = (\epsilon/(9k))^k$. Using these in Theorem 3 yields $c_1^{F_k}(\log y_{max}) = (\log y_{max})^k$, and $c_2^{F_k}(\epsilon/2) = (\epsilon/(18k))^k$. Using the sketches for $F_2$ and $F_k$,k>2 from prior work, the above result is obtained.

The space can be improved to $r^{1-2/k} \text{poly}(\epsilon^{-1} (\log(n/\delta)))$, where r is the number of distinct $x_i$-values in the stream. In the worst-case, though, r could be $\Theta(n)$. The dependence is made more explicit for the case of $F_2$.

Lemma 15:

For parameters $0 < \epsilon < 1$ and $0 < \delta < 1$, there is a sketch for $(\epsilon, \delta)$ error correlated estimation of $F_2$ on a stream of tuples of total length n, using space $O(\epsilon^{-4}(\log(1/\delta)+\log y_{max})(\log^2 y_{max})(\log^2 f_{max}))$ bits. The amortized update time is $O(\log f_{max} \cdot \log y_{max})$.

Proof:

The space taken by a sketch for an $(\epsilon, \delta)$ estimator for $F_2$ on a stream is $O((\log f_{max})(1/\epsilon^2)\log(1/\delta))$ bits. From the proof of Theorem 5, $c_1^{F_2}(j) = j^2$, and $c_2^{F_2}(\epsilon) = (\epsilon/18)^2$.

Using the above in Theorem 3, the space is $O(\epsilon^{-4} \log^2 f_{max} \log^2 y_{max}(\log 1/\delta + \log y_{max}))$ bits.

To get $O(\log f_{max}(\log 1/\delta + \log y_{max}))$ amortized processing time, observe that there are $O(\log f_{max})$ data structures $S_i$, each containing $O(\epsilon^{-2} \log^2 y_{max})$ buckets, each holding a sketch of $O(\epsilon^{-2} \log f_{max}(\log 1/\delta + \log y_{max}))$ bits. A batch of $O(\epsilon^{-2} \log^2 y_{max})$ updates is processed at once. The batch is first sorted in order of non-decreasing y-coordinate. This can be done in $O(\epsilon^{-2} \log^2 y_{max} (\log 1/\epsilon + \log \log y_{max}))$ time. Then, the following processing is done for each $S_i$. A pre-order traversal of the buckets in $S_i$ is conducted and the appropriate buckets are updated. Importantly, each bucket maintains an update-efficient AMS sketch (shown in prior work), which can be updated in time $O(\log 1/\delta + \log y_{max})$. Since the updates are sorted in increasing y-value and the list is represented as a pre-order traversal, the total time to update $S_i$ is $O(\epsilon^{-2} \log^2 y_{max}(\log 1/\delta + \log y_{max}))$. The time to update all the $S_i$ is $O(\log f_{max})$ times this. So the amortized time is $O(\log f_{max}(\log 1/\delta + \log y_{max}))$.

Other Useful Statistics

While many aggregation functions satisfy the properties described above, some important ones do not. However, in many important remaining cases, these aggregation functions are related to aggregation functions that do satisfy these properties, and the mere fact that they are related in the appropriate way enables efficient estimation of the corresponding correlated aggregate.

The correlated $F_2$-heavy hitters can be computed, as well as the rarity (defined below) by relating these quantities to $F_2$ and $F_0$, respectively.

For example, in the correlated $F_2$-heavy hitters problem with y-bound of c and parameters $\epsilon, \phi, 0 < \epsilon < \phi < 1$, letting $F_2(c)$ denote the correlated $F_2$-aggregate with y-bound of c, to return all x for which $|\{(x_i,y_i)|x_i=x \wedge y_i \le c\}|^2 \ge \phi F_2(c)$, and no x for which $|\{(x_i,y_i)|x_i=x \wedge y_i \le c\}|^2 \le (\phi-\epsilon)F_2(c)$. To do this, the same data structures $S_i$ may be used as used for estimating the correlated aggregate $F_2$. However, for each $S_i$ and each bucket in $S_i$ maintain a process is maintained for estimating the squared frequency of each item inserted into the bucket up to an additive $(\epsilon/10) \cdot 2^i$. To estimate the correlated $F_2$-heavy hitters, for each item an additive $(\epsilon/10) \cdot F_2(c)$ approximation to its squared frequency is obtained by summing up the estimates provided for it over the different buckets contained in $[0,c]$ in the data structure $S_i$ used for estimating $F_2(c)$. Since only an $\epsilon/10$ fraction of $F_2(c)$ does not occur in such buckets, the list of all heavy hitters is obtained this way, and no spurious ones.

In the rarity problem, the problem is to estimate the fraction of distinct items that occur exactly once in the multi-set. The ideas for estimating rarity are similar, where the same data structures $S_i$ are maintained for estimating the correlated aggregate $F_0$, but in each bucket maintain data structures for estimating the rarity of items inserted into that bucket.

Number of Distinct Elements

The number of distinct elements in a stream, also known as the zeroth frequency moment $F_0$, is a fundamental and widely studied statistic of the stream. Here, the correlated estimation of the number of distinct elements in a stream is described. Consider a stream of (x,y) tuples, where $x \in \{1, \ldots, m\}$ and $y \in \{1, y_{max}\}$. The process employed by an embodiment is an adaptation of the process for estimating the number of distinct elements within a sliding window of a data stream, due to prior work. Similar to prior work, the process for correlated estimation of $F_0$ is based on "distinct sampling", or sampling based on the hash values of the item identifiers. Multiple samples, $S_0, S_1, \ldots, S_k$, are maintained, where k=log m. Suppose that for simplicity, there is a hash function h that maps elements in $\{1, \ldots, m\}$ to the real interval $[0,1]$. This assumption of needing such a powerful hash function can be removed, as shown in prior work.

The process of prior work proceeds as follows. Stream items are placed in these samples $S_i$ in the following manner. (A) Each item (x,y) is placed in $S_0$. (B) For i>0, an item (x,y) is placed in level i if $$h(x) <= \frac{1}{2^i}.$$

Note that if an item x is placed in level i, it must have been placed in level i−1 also.

Since each level has a limited space budget, say α, a way to discard elements from each level is needed. The process according to an embodiment differs from prior work in the following aspect of how to discard elements from each level. For correlated aggregates, maintained in $S_i$ are only those items (x,y) that (1) have an x value that is sampled into $S_i$, and (2) have the smallest values of y among all the elements sampled into $S_i$. In other words, it is a priority queue using the y values as the weights, whereas in prior work, each level was a simple FIFO (first-in-first-out) queue.

It can be shown that the above scheme of retaining those elements with a smaller value of y, when combined with the sampling scheme in prior work, yields an $(\epsilon,\delta)$ estimator for the correlated distinct counts.

Theorem 6:

Given parameters $0<\epsilon<1$ and $0<\delta<1$, there is a streaming process that can maintain a summary of a stream of tuples (x,y), where $x\in\{1, \ldots, m\}$ and $y\in\{1,y_{max}\}$ such that: (1) The space of the summary is $$O(\log n + \log y_{max}) \frac{\log m}{\epsilon^2} \log 1/\delta$$

bits; (2) The summary can be updated online as stream elements arrive; and (3) Given a query $y_0$, the summary can return an $(\epsilon,\delta)$-estimator of the number of distinct x values among all tuples (x,y) with y values satisfying $y \leq y_0$.

Example Implementations

Correlated F2, Second Frequency Moment

An example process for correlated $F_2$ estimation was implemented in Python. The following four data sets were used for example evaluations. (1) Packet traces of Ethernet traffic on a LAN and a WAN. The relevant data here is the number of bytes in the packet, and the timestamp on the packet (in milliseconds). This data set is referred to as the "Ethernet" data set. This data set has 2 million packets, and was constructed by taking two packet traces and combining them by interleaving. (2) The Uniform data set, which is a sequence of tuples (x,y) where x is generated uniformly at random from the set $\{0, \ldots, 10000\}$ and y is generated uniformly at random from the set $\{0, \ldots, 2^{13}-1\}$. This maximum size of this data set is $10^7$. (3) The Zipfian data set, with α=1. Here the x values are generated according to the Zipfian distribution with α=1, from the domain $\{0, \ldots, 10000\}$, and the y values are generated uniformly at random from the set $\{0, \ldots, 2^{13}-1\}$. The maximum size of this dataset is $10^7$. (4) The Zipfian data set as described above, with α set to 2.

For the sketch for $F_2$, the implementation used a variant of a process developed in prior work. An observation was that for all cases tested, the relative error of the process was almost always within the desired approximation error ε, for δ<0.2.

Space Usage as a Function of ε

The space consumption of the process was studied. The space depends on a number of factors, including the values of ε, and δ. The space also depends on $f_{max}$, since $f_{max}$ determines the maximum size of the data structure at each level. But the most obvious dependence is on ε, and this dependence is explored further.

Figure 8:
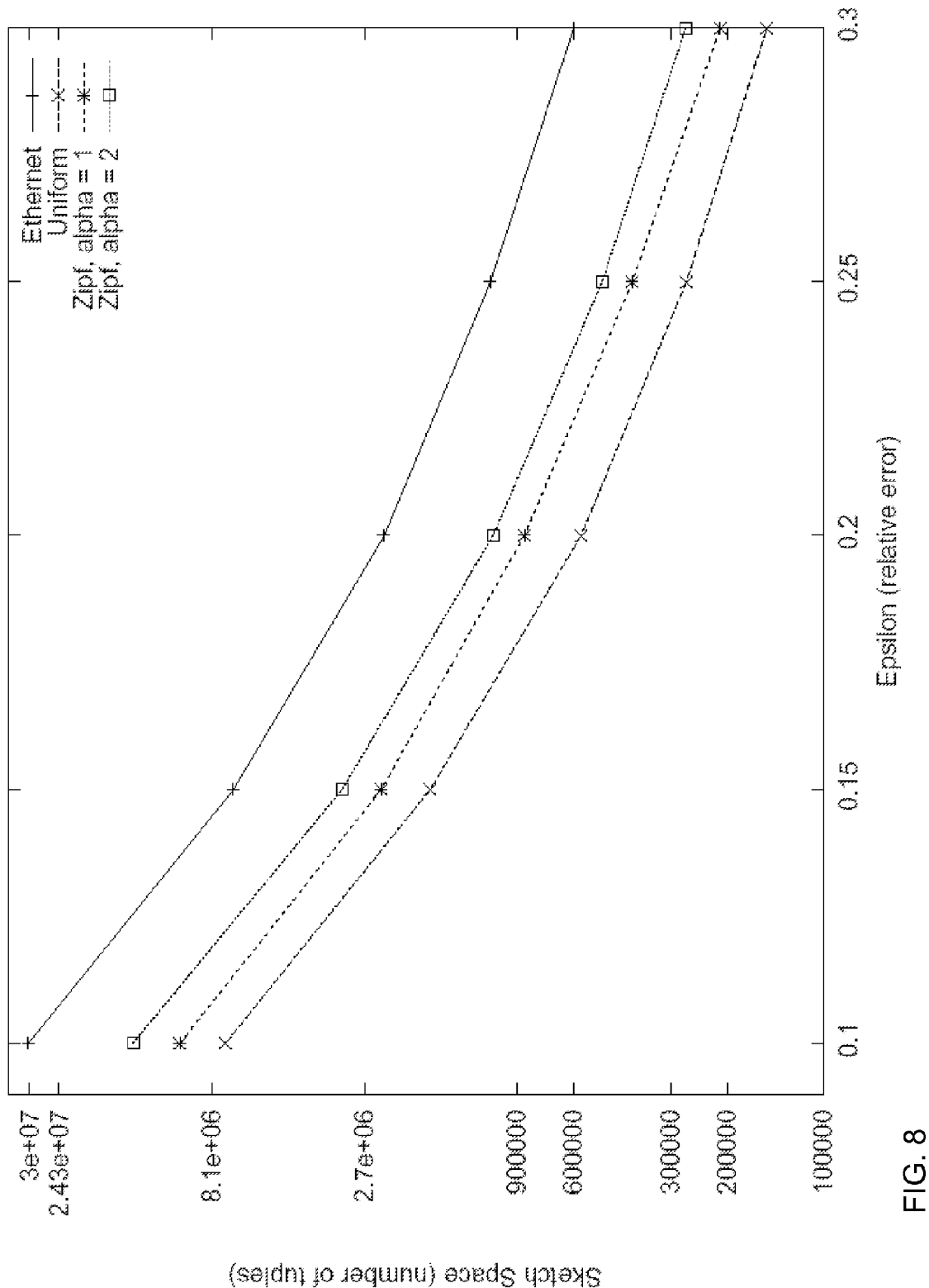
FIG. 8 illustrates examples of sketch space v. relative error for example data sets.

In FIG. 8, the space taken for the summary for $F_2$ is plotted as a function of ε. This is illustrated for all the data sets described above, with each dataset of size 2 million tuples. It is noted that the space taken by the sketch increases rapidly with decreasing ε, and the rate of the growth is similar for all four datasets. For smaller values of $\epsilon(\epsilon \leq 0.1)$, the summary data structure took even more space than the input stream itself. This is not surprising since the space increases as the fourth power of $$\frac{1}{\epsilon}.$$

It can be observed that the space taken for the Ethernet dataset is greater than the space for the Uniform and Zipfian datasets. The reason for this is that the range of the y values in the Ethernet dataset was much larger (0 to 3200000) than in the Uniform and the Zipfian datasets, where the y values ranged from 0 to 8191. The larger range of y values meant that the number of nodes at each level is larger. In addition, a larger value of $y_{max}$ also leads to a larger value of $f_{max}$, for the Ethernet dataset than for the other datasets, and hence also to a larger number of levels of data structures. However, note that the rate of growth of the space with respect to ε remains similar for all data sets. For smaller values of $\epsilon(\epsilon \leq 0.15)$, the summary data structure often took even more space than the input stream itself. This is not surprising since the space increases as the fourth power of $$\frac{1}{\epsilon}.$$

As described herein, the space savings of the sketch improves as the stream size increases.

Space Usage as a Function of the Stream Size

Figure 9:
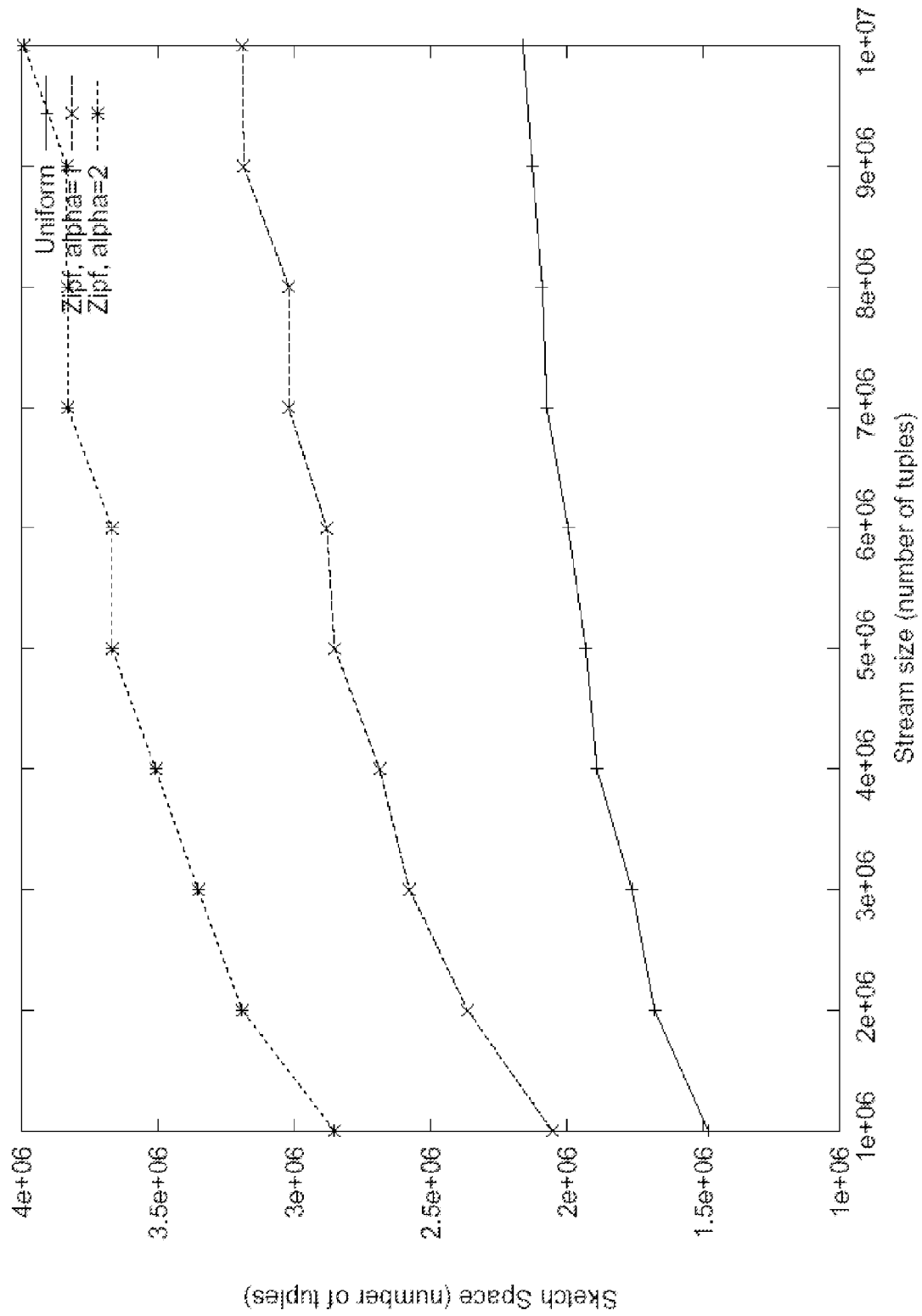
FIG. 9 illustrates examples of sketch space v. stream size for example data sets.
Figure 10:
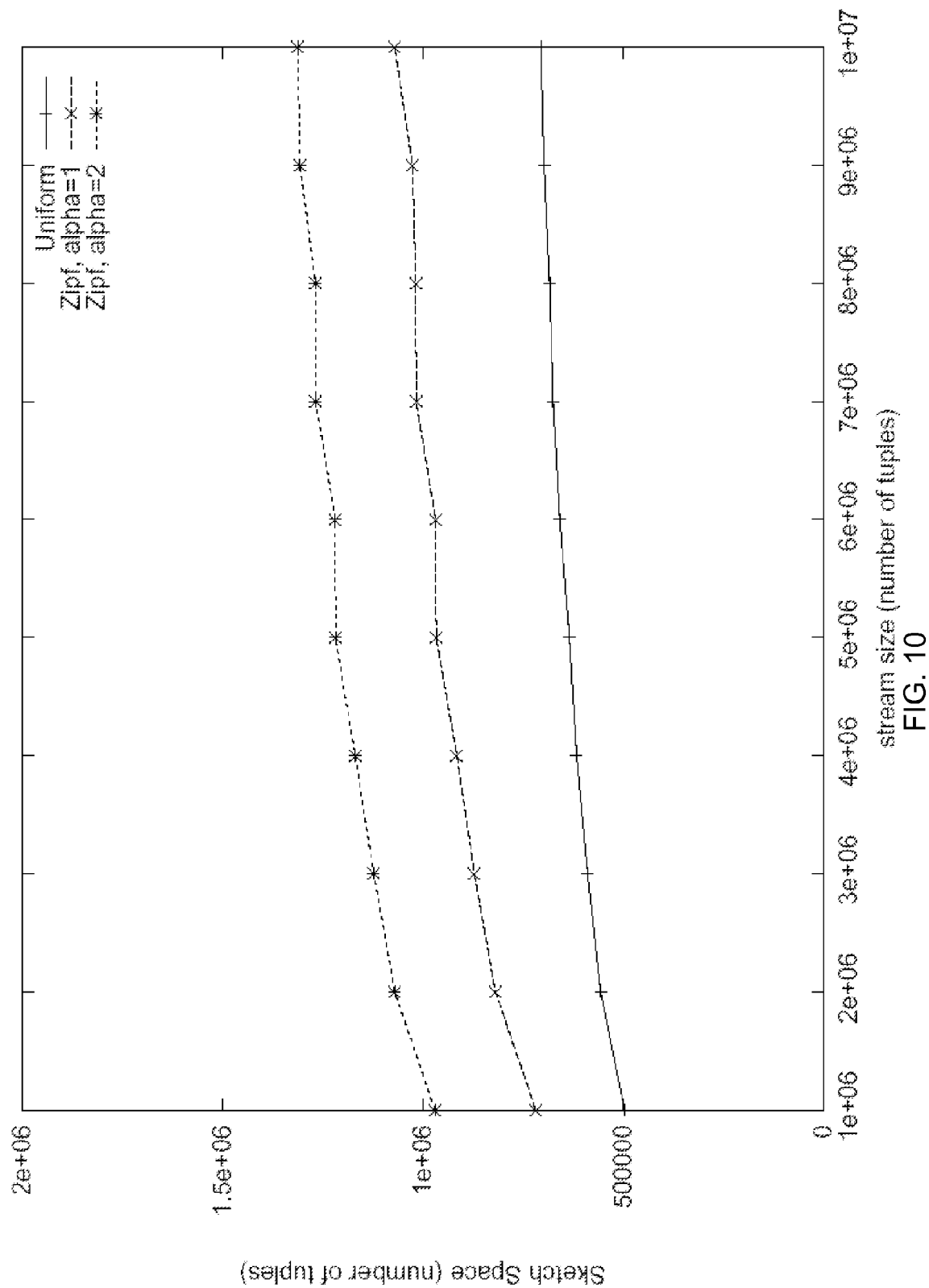
FIG. 10 illustrates examples of sketch space v. stream size for example data sets.
Figure 11:
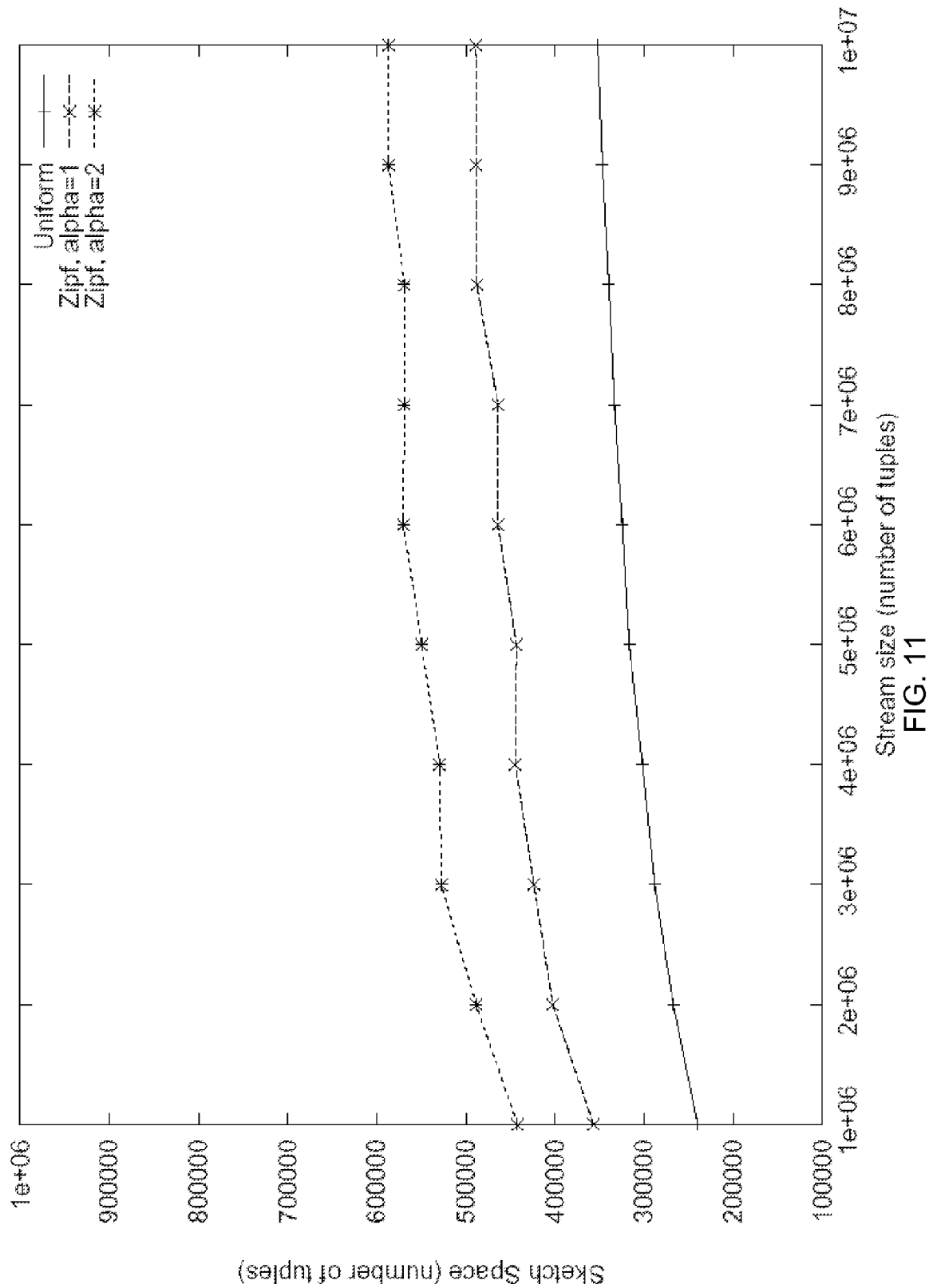
FIG. 11 illustrates examples of sketch space v. stream size for example data sets.

Example results are illustrated in FIG. 9 (for ε=0.15), FIG. 10 (for ε=0.2), and FIG. 11 (for ε=0.25). In all cases, as predicted by theory, the space taken by the sketch does not change much, and increases only slightly as the stream size increases. This shows that the space savings of the process is much larger with streams that are larger in size.

The time required for processing the stream of 2 million elements was nearly the same (about 5 minutes) for the Uniform, Zipfian, as well as Ethernet datasets. The processing rate can be improved by using the C/C++ language, and by using a more optimized implementation.

These example results illustrate that a reasonable processing rate can be achieved for the data structure for $F_2$, and that correlated query processing is indeed practical, and provides significant space savings, especially for large data streams (of the order of 10 million tuples or larger).

Correlated $F_0$, Number of Distinct Elements

An example of the process for $F_0$ in Python and four data sets, as described in the case of $F_2$, was also implemented. The only difference was that in the Uniform and Zipfian datasets, the range of x values was much larger (0 ... 1000000) than in the case of $F_2$, where the range of x values was 0 ... 10000. The reason for this change is that there are much simpler approaches for correlated $F_0$ estimation when the domain size is small: simply maintain the list of all distinct elements seen so far along the x dimension, along with the smallest value associated with it in the y dimension. Note that such a simplification is not (easily) possible for the case of $F_2$.

Figure 12:
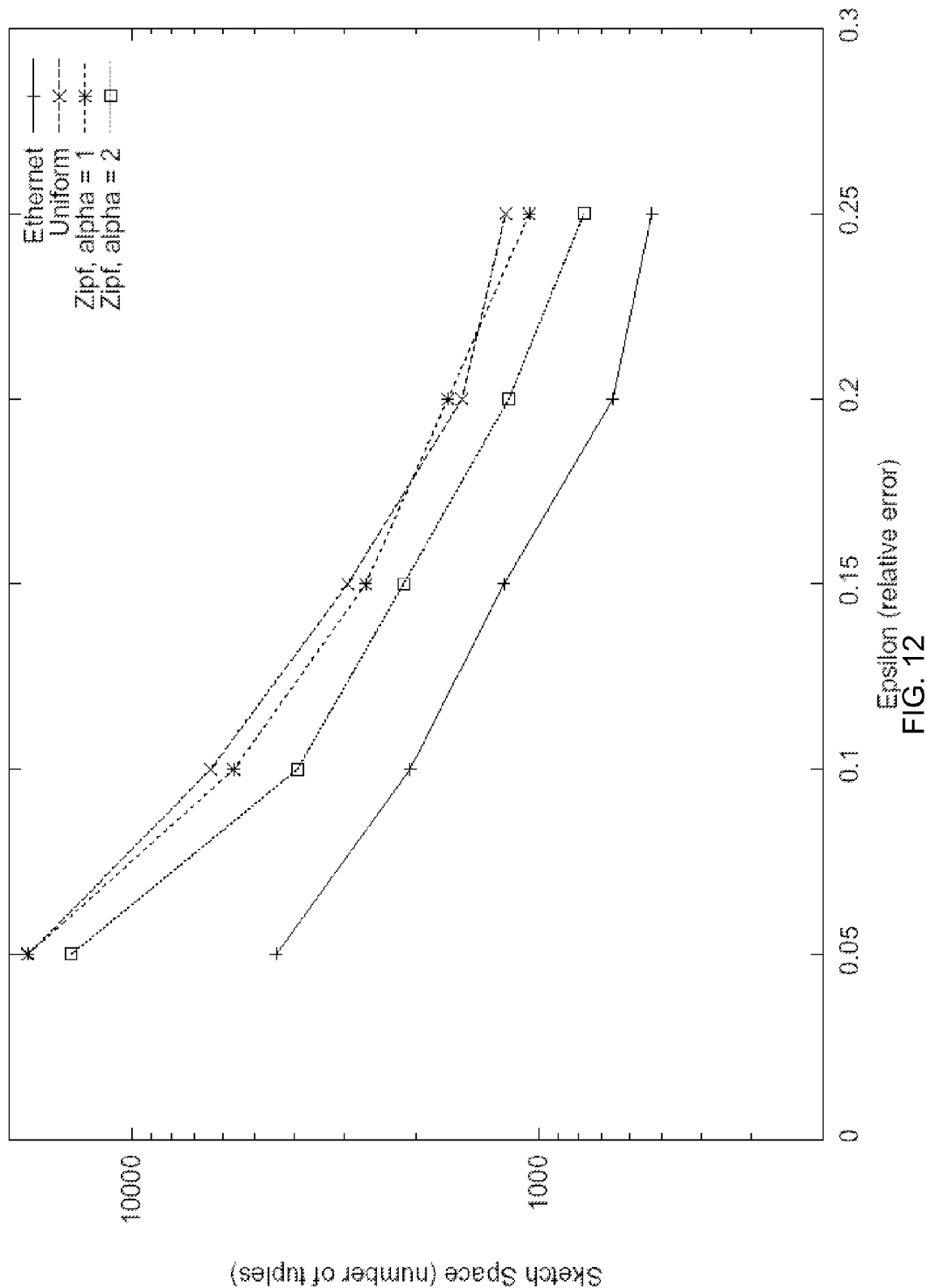
FIG. 12 illustrates examples of sketch space v. relative error for example data sets.

The variation of the sketch size with E is shown in FIG. 12. Note that while the sketch size decreases with increasing ε, the rate of decrease was not as fast as in the case of $F_2$. Further, note that the sketch size for comparable values of ε was much smaller than the sketch for correlated $F_2$. Another point is that the space taken by the sketch for the Ethernet dataset was significantly smaller than the sketch for the other datasets. This is due to the fact that the range of x values in the Ethernet dataset was much smaller (0 ... 2000) than for the other datasets (0 ... 1000000). The number of levels in the data structure is proportional to the logarithm of the number of possible values along the x dimension. Note that as explained above, the process of choice for correlated $F_0$ estimation for the Ethernet-type datasets (where the x range is small) will be different, as explained herein. Thus, the process is particularly useful for datasets where the x range is much larger.

Figure 13:
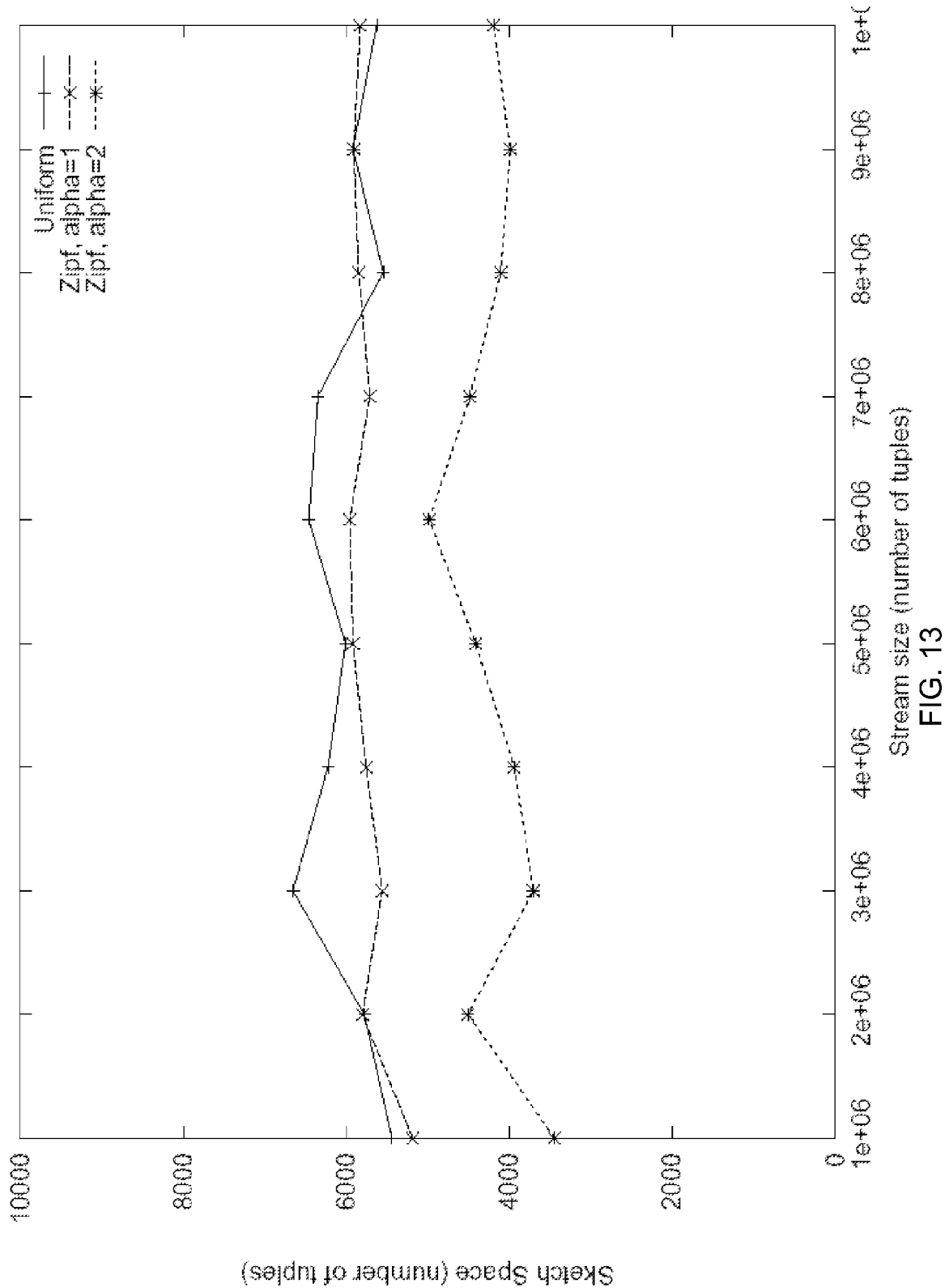
FIG. 13 illustrates examples of sketch space v. stream size for example data sets.

The size of the sketch as a function of the stream size is shown in FIG. 13, for $\epsilon=1$. It can be seen that the sketch size hardly changed with the stream size. Note however, that for much smaller streams, the sketch will be smaller, since some of the data structures at different levels have not reached their maximum size yet. The results for other values of $\epsilon$ are similar, and are not shown here.

Figure 14:
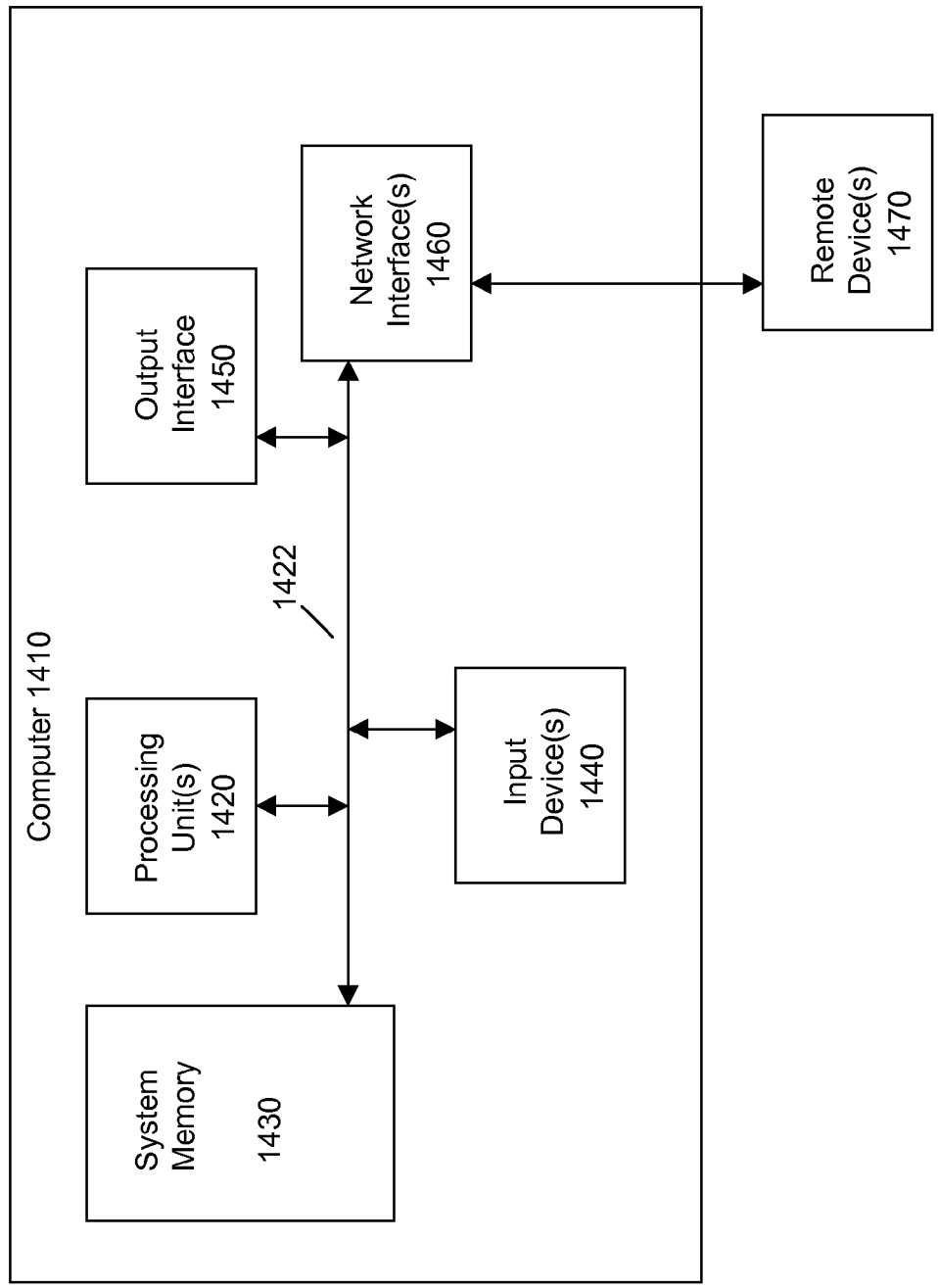
FIG. 14 illustrates an example computer system.

Accordingly, embodiments provide for computing correlated aggregates over a data stream. Referring to FIG. 14, it will be readily understood that embodiments may be implemented using any of a wide variety of devices or combinations of devices. An example device that may be used in implementing embodiments includes a computing device in the form of a computer 1410. In this regard, the computer 1410 may execute program instructions configured to compute correlated aggregates over a data stream, and perform other functionality of the embodiments, as described herein.

Components of computer 1410 may include, but are not limited to, at least one processing unit 1420, a system memory 1430, and a system bus 1422 that couples various system components including the system memory 1430 to the processing unit(s) 1420. The computer 1410 may include or have access to a variety of computer readable media. The system memory 1430 may include computer readable storage media in the form of volatile and/or nonvolatile memory such as read only memory (ROM) and/or random access memory (RAM). By way of example, and not limitation, system memory 1430 may also include an operating system, application programs, other program modules, and program data.

A user can interface with (for example, enter commands and information) the computer 1410 through input devices 1440. A monitor or other type of device can also be connected to the system bus 1422 via an interface, such as an output interface 1450. In addition to a monitor, computers may also include other peripheral output devices. The computer 1410 may operate in a networked or distributed environment using logical connections (network interface 1460) to other remote computers or databases (remote device(s) 1470). The logical connections may include a network, such local area network (LAN) or a wide area network (WAN), but may also include other networks/buses.

As will be appreciated by one skilled in the art, aspects may be embodied as a system, method or computer program product. Accordingly, aspects of the present invention may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects of the present invention may take the form of a computer program product embodied in at least one computer readable medium(s) having computer readable program code embodied thereon.

Any combination of at least one computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-signal medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described with reference to figures of methods, apparatus (systems) and computer program products according to embodiments. It will be understood that portions of the figures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

APPENDIX

Proof of Lemma 1

*Proof:* Let $a$ denote the base of the counter, $a = 1 + \gamma$. Let the different states of the counter be $1, 2, \ldots, k$. In state $i$, the estimate of the count is $\frac{a^i - 1}{a - 1}$. Thus, we choose $k = \log_a(a + (a-1)M)$, so that the maximum estimate is $M = \frac{a^k - a}{a - 1}$.

When incremented in state $i$, the counter goes to state $i+1$ with probability $\frac{1}{a^i}$, and remains in state $i$ with probability $1 - \frac{1}{a^i}$. Let $X_i$ denote the number of increments to get from state $i$ to $i+1$. Then $X_i$ is a geometric random variable with $E[X_i] = a^i$, and $VAR[X_i] = (a^{2i} - a^i)$.

$$\mathcal{I}(C) = 1 + \sum_{i=1}^{k-1} X_i \qquad (13)$$

By linearity of expectation, we get:

$$E[\mathcal{I}(C)] = 1 + \sum_{i=1}^{k-1} E[X_i] = \sum_{i=0}^{k-1} a^i = \frac{a^k - 1}{a - 1} = M + 1 \qquad (14)$$

Since the $X_i$s are all independent, we get $$VAR[\mathcal{I}(C)] = \sum_{i=1}^{k-1} VAR[X_i] = \sum_{i=1}^{k-1}(a^{2i} - a^i) = \frac{(a^k - a)(a^k - 1)}{(a-1)(a+1)} \qquad (15)$$

Using $M = \frac{a^k - a}{a - 1}$, and $\frac{a^k - 1}{a + 1} < \frac{a^k - 1}{2} < (\frac{a-1}{2})\frac{a^k - 1}{a - 1} = \frac{a-1}{2}(M+1)$, we have $$VAR[\mathcal{I}(C)] < \frac{(a-1)M(M+1)}{2} = \gamma M(M+1)/2$$

∎

Proof of Lemma 8

*Proof:* Since every bucket $b \in B_1$ must satisfy $span(b) \in [0, c]$, every element inserted into $b \in S_1$ must belong in $A$. Hence $S(B_1) \subseteq A$.

Each element in $A$ has been inserted into some bucket in $S_i$, and because $Y_i \geq c$, none of the buckets containing an element of $A$ have been discarded from $S_i$ so far. By the definitions of $B_1$ and $B_2$, any bucket in $S_i$ that has a non-empty intersection with $A$ must belong to either $B_1$ or $B_2$. Thus, $A \subseteq S(B_1 \cup B_2)$. ∎

Proof of Lemma 11

*Proof:* Since the algorithm used level $i$ for answering the query, it must be the case that there are buckets in $S_{i-1}$ that had an intersection with $[0, c]$ but were discarded from the data structure.

It follows that there are at most $\log y_{max}$ buckets $b \in S_{i-1}$ such that $span(b) \not\subset [0, c]$. For the remaining buckets $b \in S_{i-1}$, it must be true that $span(b) \subset [0, c]$. Since $S_{i-1}$ is a binary tree with $\alpha$ nodes, it must have $(\alpha - 1)/2$ internal nodes.

Suppose $I$ denoted the set of buckets in $b \in S_{i-1}$ such that $b$ is an internal node, and $span(b) \subset [0, c]$. Thus $|I| \geq (\alpha - 1)/2 - \log y_{max}$. For any bucket $b \in I$, we have $f(b) \geq \frac{2^{i-1}}{1+v}$, with probability at least $1 - \gamma$.

There are no more than $2y_{max}$ buckets possibly created in each level, including the $y_{max}$ possible singleton buckets, and all their ancestors put together. Using an union bound, the probability that every bucket $b \in I$ satisfies $f(b) \geq \frac{2^{i-1}}{1+v}$, is at least $1 - 2y_{max}\gamma$.

Using property II repeatedly, we get:

$$f(A) \geq f(I) \geq \frac{|I|2^{i-1}}{1+v}$$

Using $v < 1$, and for an appropriately large value of $\alpha$, we have $((\alpha - 1)/2 - \log y_{max}) \geq \alpha/4$. Combining the above, we get the following with probability at least $1 - 2y_{max}\gamma$:

$$f(A) \geq \frac{\alpha 2^i}{2 \cdot 2 \cdot 4 \cdot 2} = 2^{i-5}\alpha$$

∎

Proof of Theorem 4.

*Proof:* $est = est_f(B_1)$, and $f(S, c) = f(A)$. From Lemma 9, we have:

$$\Pr[est_f(B_1) \geq (1-v)f(B_1)] \geq 1 - \gamma \qquad (16)$$

From Equation 12, we have:

$$f(A) \leq f(B_1 \cup B_2) \qquad (17)$$

From Lemmas 10 and 11, and applying a union bound, we have the following with probability at least $1 - (\log y_{max} + 2y_{max})\gamma$:

$$\frac{f(B_2)}{f(A)} \leq \frac{c_1^f (\log y_{max})2^{i+2}}{\alpha 2^{i-5}} \leq \frac{c_1^f (\log y_{max})2^7}{\alpha} \leq c_2^f \left(\frac{\epsilon}{2}\right) \qquad (18)$$

Where we have substituted the value of $\alpha$. Since $(A - B_1) \subseteq B_2$, we have the following with probability at least $1 - (\log y_{max} + 2y_{max})\gamma$:

$$\frac{f(A - B_1)}{f(A)} \leq c_2^f \left(\frac{\epsilon}{2}\right) \qquad (19)$$

Using property IV, we get the following with probability at least $1 - (\log y_{max} + 2y_{max})\gamma$:

$$f(B_1) \geq f(A - (A - B_1)) \geq \left(1 - \frac{\epsilon}{2}\right)f(A) \qquad (20)$$

From Equations 20 and 16, we get the following with probability at least $1 - (\log y_{max} + 2y_{max} + 1)\gamma$:

$$est_f(B_1) \geq (1 - \epsilon/2)(1 - v)f(A) \geq (1 - \epsilon)f(A) \qquad (21)$$

This proves one direction of the theorem. For the other direction, we note that from Lemma 9, the following is true with probability at least $1 - \gamma$:

$$est_f(B_1) \leq (1 + v)f(B_1)$$

Since $f(B_1) \leq f(A)$, the theorem follows by noting $(\log y_{max} + 2y_{max} + 2)\gamma < \delta$. ∎

Proof of Lemma 13.

*Proof:* Suppose $A$ and $B$ have support on $\{1, 2, \ldots, n\}$. Let $a$ and $b$ be the characteristic vectors of sets $A$ and $B$, respectively. Using Fact 1, we have $$F_k(A \cup B) = \sum_{i=1}^{n}(a_i + b_i)^k$$

$$= F_k(A) + F_k(B) + \sum_{i=1}^{n}\sum_{j=1}^{k-1}\binom{k}{j}a_i^j b_i^{k-j}$$

$$= F_k(A) + F_k(B) + \sum_{j=1}^{k-1}\binom{k}{j}\sum_{i=1}^{n}a_i^j b_i^{k-j}$$

$$\leq F_k(A) + F_k(B) + \sum_{j=1}^{k-1}\binom{k}{j}\left(\sum_{i=1}^{n}(a_i^j)^{k/j}\right)^{\frac{j}{k}}\left(\sum_{i=1}^{n}(b_i^{k-j})^{k/(k-j)}\right)^{\frac{k-j}{k}}$$

$$= F_k(A) + F_k(B) + \sum_{j=1}^{k-1}\binom{k}{j}F_k(A)^{\frac{j}{k}}F_k(B)^{\frac{k-j}{k}}$$

$$\leq F_k(A) + F_k(B) + \sum_{j=1}^{k-1}\binom{k}{j}F_k(A)\left(\frac{\epsilon}{3k}\right)^{k-j}$$

$$\leq (1 + \epsilon/3)F_k(A) + F_k(A)\sum_{j=1}^{k-1}\binom{k}{j}(\epsilon/(3k))^{k-j}$$

$$\leq (1 + \epsilon/3)F_k(A) + F_k(A)(1 + \epsilon/(3k))^k - F_k(A)$$

$$\leq (1 + \epsilon/3)F_k(A) + F_k(A)(1 + 2\epsilon/3) - F_k(A)$$

$$\leq (1 + \epsilon)F_k(A),$$

where we used that $(1 + x)^y \leq e^{xy}$ for all $x$ and $y$, and $e^z \leq 1 + 2z$ for $z \leq 1/2$. This completes the proof. ∎

Proof of Lemma 14.

*Proof:* We know that for any two sets $A$ and $B$, $F_k(A \cup B) \leq 2^k(F_k(A) + F_k(B))$.

$$F_k(D) = F_k((D - C) \cup (C))$$
$$\leq 2^k(F_k(D - C) + F_k(C))$$

which leads to $$F_k(D - C) \geq F_k(D)/2^k - F_k(C)$$
$$\geq ((9k/\epsilon)^k(1/2^k)^k - 1)F_k(C)$$
$$\geq (3k/\epsilon)^k F_k(C)$$

Thus, $F_k(C) \leq (\epsilon/3k)^k F_k(D - C)$. Applying Lemma 13, we get $F_k(C \cup (D - C)) \leq (1 + \epsilon)F_k(D - C)$. Thus, $F_k(D - C) \geq F_k(D)/(1 + \epsilon) \geq (1 - \epsilon)F_k(D)$. ∎

Proof of Theorem 9.

*Proof:* By increasing the space complexity of ALG by an $O(\log y_{max})$ factor, e.g., using independent repetition and taking the median of outputs, we can assume that ALG is correct for all $0 \leq \tau \leq y_{max}$.

We reduce from the GREATER-THAN communication problem on input strings of length $y_{max}$. Letting $a_1, \ldots, a_{y_{max}}$ be the binary representation of A's input $a$, where $a_1$ is the most significant bit, A inserts the values $(1 + a_i, i)$ with weight 1 into the stream, where $1 \leq i \leq y_{max}$. A feeds this stream to ALG. After completion, A sends the state of ALG to B who inserts the values $(1 + b_i, i)$ with weight $-1$ into the stream, for $1 \leq i \leq y_{max}$. B then sends the state of ALG back to A, who continues the computation of ALG on the stream A has created. If ALG uses $t$ passes, this results in a $(2t - 1)$-round communication protocol. Observe that the stream length $n = 2y_{max}$.

At the end of the $(2t - 1)$-st round, ALG is queried on $\tau = 0, 1, 2, \ldots, y_{max}$. Let $\tau$ be the smallest non-zero index returned by ALG for which the estimate to $f_\tau$ is positive. If $b_\tau = 1$, B declares that $b > a$, otherwise B declares that $a > b$. If for all $\tau$ the estimate to $f_\tau$ is 0, B declares $b = a$. Correctness follows from the two facts (1) the statement $a > b$ is equivalent to having the first index $\tau$ at which $a$ and $b$ disagree in their binary representation satisfying $a_\tau = 1$ while $b_\tau = 0$, and (2) $g(k) = 0$ iff $k = 0$. It follows from Theorem 9 that ALG must use $\Omega(y_{max}^{1/(2t-1)}/\log y_{max}) = y_{max}^{\Omega(1/t)}/\log y_{max}$ bits of space. ∎

Proof of Theorem 10: The pass and space complexity of MULTIPASS follow immediately from the description of the algorithm given in Figure 14. It remains to argue correctness. We condition on the event $\mathcal{E}$ that, for every $\tau \in \{0, 1, 2, \ldots, y_{max}\}$, algorithm $\mathcal{A}$ outputs an estimate $\hat{f}_\tau$ with $(1 - \epsilon)f_\tau \leq \hat{f}_\tau \leq (1 + \epsilon)f_\tau$. Since $\mathcal{A}$ fails with probability at most $\delta'$, it follows that $\Pr[\mathcal{E}] \geq 1 - \delta$.

Consider $p(i)$ for some $i \in \{0, 1, 2, \ldots, r\}$.

We first would like to argue that $f_{p(i)} \geq (1 - \epsilon)(1 + \epsilon)^i$. Consider the behavior of the algorithm before Step 12 is reached. At some point the nearest common ancestor $a$ in the tree on leaves $\{0, 1, 2, \ldots, r\}$ of $p(i)$ and $p(i) + 1$ was considered, and the algorithm branched to the left. This means $\hat{f}_{p(i)+1} > (1 + \epsilon)^i$. Now, once Step 12 is reached, if $\hat{f}_{p(i)} < (1 + \epsilon)^i$, then $p(i)$ is replaced with $p(i) + 1$, and so after Step 12 we are guaranteed that $\hat{f}_{p(i)} \geq (1 + \epsilon)^i$. This means that $$f_{p(i)} \geq \frac{\hat{f}_{p(i)}}{1 + \epsilon} \geq \frac{(1 + \epsilon)^i}{1 + \epsilon} \geq (1 - \epsilon) \cdot (1 + \epsilon)^i.$$

Second, we would like to argue that $f_{p(i)-1} \leq (1 + \epsilon)^i$. Consider the behavior of the algorithm before Step 12 is reached. At some point the nearest ancestor $a$ in the tree on leaves $\{0, 1, 2, \ldots, r\}$ of $p(i) - 1$ and $p(i)$ was considered, and the algorithm branched to the right. This means $\hat{f}_{p(i)-1} \leq$ $(1+\varepsilon)^i$. Now, once Step 12 is reached, if $\hat{f}_{p(i)} \geq (1+\varepsilon)^i$, then $p(i)-1$ remains the same. Otherwise, $p(i)-1$ is replaced with $p(i)$, and so after Step 12 we have $\hat{f}_{p(i)-1} < (1+\varepsilon)^i$. Hence, in either case, $$f_{p(i)-1} \leq \hat{f}_{p(i)-1} \leq (1+\varepsilon)^i.$$

Given a query $\tau$, the QUERY-RESPONSE algorithm first finds the largest value of $i$ for which $p(i) \leq \tau$. It then outputs $(1+\varepsilon)^i$. Since $\tau \geq p(i)$, we have $$f_\tau \geq f_{p(i)} \geq (1-\varepsilon)(1+\varepsilon)^i.$$

Since $p(i)+1 > \tau$, we have $$f_\tau \leq f_{p(i)+1} \leq (1+\varepsilon)^{i+1}.$$

It follows that the output of $(1+\varepsilon)^i$ is a $(1+\varepsilon)$-approximation, as desired. ∎

What is claimed is:

1. A computer program product for summarizing attributes of data elements of a data set for computing correlated aggregates, comprising:
   a computer readable storage medium having computer readable program code embodied therewith, the computer readable program code comprising:
   computer readable program code configured to receive a stream of data elements at a device, each data element having at least one numerical attribute;
   computer readable program code configured to maintain in memory a plurality of tree structures comprising a plurality of separate nodes for summarizing numerical attributes of the data elements with respect to a predicate value of a correlated aggregation query, wherein to maintain further comprises:
   computer readable program code configured to create the plurality of tree structures in which each node implements one of: a probabilistic counter and a sketch, wherein said probabilistic counter and said sketch each act to estimate aggregated data element numerical attributes to form a summary of said numerical attributes, said probabilistic counter providing an estimated count via incrementing by a predetermined weight in response to an increment operation; and
   computer readable program code configured to, responsive to a correlated aggregation query specifying said predicate value, use said plurality of tree structures as a summary of said data element numerical attributes to compute a response to said correlated aggregate query.

2. The computer program product of claim 1, wherein estimation of aggregated data element numerical attributes to form said summary of said data element numerical attributes is within a predetermined relative error.

3. The computer program product of claim 2, wherein a memory size requirement for maintaining the summary of said data element numerical attributes is a function of the predetermined relative error.

4. The computer program product of claim 1, wherein each node implements a probabilistic counter, and further wherein said correlated aggregation query is a count query with respect to said predicate value.

5. The computer program product of claim 4, wherein nodes of said plurality of tree structures are organized into levels of probabilistic counters.

6. The computer program product of claim 5, wherein each level of nodes provides a more refined interval for counting said numerical attributes of said data elements.

7. The computer program product of claim 6, wherein each node is capped to a predetermined size, and further wherein, responsive to the predetermined size being reached, two child nodes are formed for a parent node.

8. The computer program product of claim 1, wherein each node implements a sketch function suitable for a statistical inquiry specified in said correlated aggregation query.

9. The computer program product of claim 8, wherein said statistical inquiry is computation of a frequency moment $F_k$ of said data stream.

10. The computer program product of claim 1, wherein said stream of data elements comprises a stream of IP packets, wherein said data elements comprise IP packets, and further wherein said numerical attributes comprise sizes of said IP packets.

11. A system for summarizing attributes of data elements of a data set for computing correlated aggregates, comprising:
   at least one processor; and
   a memory device operatively connected to the at least one processor;
   wherein, responsive to execution of program instructions accessible to the at least one processor, the at least one processor is configured to:
   receive a stream of data elements at a device, each data element having at least one numerical attribute;
   maintain in memory a plurality of tree structures comprising a plurality of separate nodes for summarizing numerical attributes of the data elements with respect to a predicate value of a correlated aggregation query, wherein to maintain further comprises:
   create the plurality of tree structures in which each node implements one of: a probabilistic counter and a sketch, wherein said probabilistic counter and said sketch each act to estimate aggregated data element numerical attributes to form a summary of said numerical attributes, said probabilistic counter providing an estimated count via incrementing by a predetermined weight in response to an increment operation; and
   responsive to a correlated aggregation query specifying said predicate value, use said plurality of tree structures as a summary of said data element numerical attributes to compute a response to said correlated aggregate query.

12. The system of claim 11, wherein said stream of data elements comprises a stream of IP packets, wherein said data elements comprise IP packets, and further wherein said numerical attributes comprise sizes of said IP packets.

* * * * *